(12) United States Patent
Dergosits et al.

(10) Patent No.: US 11,838,884 B1
(45) Date of Patent: Dec. 5, 2023

(54) LOW POWER MODE FOR CLOUD-CONNECTED ON-VEHICLE GATEWAY DEVICE

(71) Applicant: Samsara Inc., San Francisco, CA (US)

(72) Inventors: Maxwell Dergosits, San Rafael, CA (US); Jim Rowson, Tarrytown, NY (US); Kevin Russell Coates Lloyd, San Carlos, CA (US)

(73) Assignee: Samsara Inc., San Francisco, CA (US)

( * ) Notice: Subject to any disclaimer, the term of this patent is extended or adjusted under 35 U.S.C. 154(b) by 270 days.

(21) Appl. No.: 17/306,717

(22) Filed: May 3, 2021

(51) Int. Cl.
| | |
|---|---|
| *H04W 56/00* | (2009.01) |
| *H04W 76/20* | (2018.01) |
| *H04W 4/40* | (2018.01) |
| *G07C 5/00* | (2006.01) |
| *G06F 1/3287* | (2019.01) |

(52) U.S. Cl.
CPC ...... *H04W 56/0025* (2013.01); *G06F 1/3287* (2013.01); *G07C 5/008* (2013.01); *H04W 4/40* (2018.02); *H04W 76/20* (2018.02)

(58) Field of Classification Search
CPC ......... H04W 4/029; H04W 4/48; H04W 4/46; G06F 1/00; G06F 13/1668; G06F 2213/0026
See application file for complete search history.

(56) References Cited

U.S. PATENT DOCUMENTS

| | | |
|---|---|---|
| 5,917,433 A | 6/1999 | Keillor et al. |
| 6,452,487 B1 | 9/2002 | Krupinski |
| 8,633,672 B2 | 1/2014 | Jung et al. |
| 9,024,744 B2 | 5/2015 | Klose et al. |
| 9,445,270 B1 | 9/2016 | Bicket et al. |
| 9,477,639 B2 | 10/2016 | Fischer et al. |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,390,227 B2 | 8/2019 | Bicket et al. |
| 10,579,123 B2 | 3/2020 | Tuan et al. |
| 10,609,114 B1 | 3/2020 | Bicket et al. |
| 10,623,899 B2 | 4/2020 | Watkins et al. |

(Continued)

*Primary Examiner* — Iqbal Zaidi

(74) *Attorney, Agent, or Firm* — Knobbe, Martens, Olson & Bear LLP

(57) ABSTRACT

A system receives vehicle metric data from a gateway device connected to a vehicle via a network connection. In a first power mode, the vehicle gateway device gathers vehicle metric data related to operation of the vehicle and/or location data and sends requested vehicle metric data to the system. Based on a lack of input, the vehicle gateway device enters a standby power mode to reduce the power consumption of the vehicle gateway device. The vehicle gateway device reduces the power consumption by reducing activity of the vehicle gateway device. Instead of reinitiating a network connection periodically to receive requests for vehicle metric data from the system, the vehicle gateway device maintains the network connection by sending keep alive messages between the vehicle gateway device and the system. The system uses the maintained network connection to request vehicle metric data.

20 Claims, 10 Drawing Sheets

(56) References Cited

U.S. PATENT DOCUMENTS

| | | |
|---|---|---|
| 10,827,324 B1 | 11/2020 | Hajimiri et al. |
| 10,843,659 B1 | 11/2020 | Innocenzi et al. |
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 11,522,857 B1 | 12/2022 | Symons et al. |
| 11,558,449 B1 | 1/2023 | Bicket et al. |
| 11,590,907 B2 * | 2/2023 | Sugawa .................. H04L 67/12 |
| 11,599,097 B1 | 3/2023 | Gal et al. |
| 11,606,736 B1 | 3/2023 | Lloyd et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 2002/0061758 A1 | 5/2002 | Zarlengo et al. |
| 2005/0286774 A1 | 12/2005 | Porikli |
| 2006/0167591 A1 | 7/2006 | McNally |
| 2008/0319602 A1 | 12/2008 | McClellan et al. |
| 2009/0240427 A1 | 9/2009 | Siereveld et al. |
| 2010/0049639 A1 | 2/2010 | Ferro et al. |
| 2011/0276265 A1 | 11/2011 | Husain |
| 2012/0201277 A1 | 8/2012 | Tanner et al. |
| 2012/0235625 A1 | 9/2012 | Takehara |
| 2012/0303397 A1 | 11/2012 | Prosser |
| 2013/0162421 A1 | 6/2013 | Inaguma et al. |
| 2013/0244210 A1 | 9/2013 | Nath et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0226563 A1 | 8/2015 | Cox et al. |
| 2015/0283912 A1 | 10/2015 | Shimizu et al. |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0102463 A1 | 4/2017 | Hwang |
| 2017/0140603 A1 | 5/2017 | Ricci |
| 2017/0263049 A1 | 9/2017 | MacDonald et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0212967 A1 * | 7/2018 | Chen .................. H04W 12/069 |
| 2018/0262724 A1 | 9/2018 | Ross |
| 2019/0003848 A1 | 1/2019 | Hoten et al. |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1 | 10/2019 | VanderZanden |
| 2019/0327590 A1 | 10/2019 | Kubo et al. |
| 2019/0327613 A1 | 10/2019 | Bicket et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0389415 A1 | 12/2020 | Zhao et al. |
| 2021/0006950 A1 | 1/2021 | Hajimiri et al. |
| 2021/0287631 A1 * | 9/2021 | Yang .................. H04N 19/436 |

* cited by examiner

LOW POWER MODE FOR CLOUD-CONNECTED ON-VEHICLE GATEWAY DEVICE

TECHNICAL FIELD

Embodiments of the present disclosure relate to vehicle gateway devices, sensors, systems, and methods that allow for efficient monitoring, management, data acquisition, and data processing for vehicles and/or fleets. Embodiments of the present disclosure further relate to devices, systems, and methods that provide a low-power mode for a cloud-connected on-vehicle gateway device for vehicle and/or fleet monitoring and management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most modern vehicles have a vehicle bus. A vehicle bus is an internal communications network that connects components, such as a car's electronic controllers, within a vehicle. Example protocols that a vehicle bus can use include, but are not limited to, Controller Area Network (CAN), Local Interconnect Network (LIN), OBD-II or OBD2, and/or J1939. The vehicle bus can have an interface that enables an external device to access the vehicle's electronic controllers. In particular, the external device can access vehicle diagnostics, such as fuel level, engine revolutions per minute (RPM), speed, engine torque, engine load, brake use, etc. The vehicle diagnostic data can be voluminous. Moreover, the vehicle diagnostic data can be retrieved substantially in real-time and at a high frequency, such as every millisecond. Additional devices that can collect data from a vehicle include cameras and sensors, such as dashboard cameras and temperature monitors.

SUMMARY

The systems, methods, and devices described herein each have several aspects, no single one of which is solely responsible for its desirable attributes. Without limiting the scope of this disclosure, several non-limiting features will now be described briefly.

Commercial vehicle fleets use large amounts of fuel and energy. Due to the complexity and diversity of the activities of vehicles in a commercial fleet, it can be very difficult to determine why and how the fuel and energy are used, let alone how to increase the efficiency with which the fuel and energy are used. A vehicle gateway device can be attached to each vehicle in the fleet. The vehicle gateway device gathers data related to operation of the vehicle, in addition to location data and other data related to the vehicle. The vehicle gateway device can use large amounts of energy at a full power mode and can be placed into a standby power mode (e.g., a low power mode) to reduce the amount of power consumed by the vehicle gateway device by reducing the number of active peripherals for the vehicle gateway devices (e.g., by deactivating particular peripherals). Due to the number of inactive peripherals, it is very difficult to complete data retrievals in a timely manner when the vehicle gateway device is in a standby power mode. When the vehicle gateway device is in a moderate power mode, the vehicle gateway device may maintain the peripherals and may receive data retrieval requests and exit the moderate power mode to complete the data retrievals. However, when the vehicle gateway device is in a standby mode, the vehicle gateway device may only wake up periodically (e.g., once every six hours) and data may not be retrieved until the vehicle gateway device wakes up (therefore data only may be retrieved every six hours). Additionally, when the vehicle gateway device is communicating with a management server, the power consumed by the vehicle gateway device can be voluminous, so just maintaining the power consumed by the vehicle gateway device at a reduced state while in the standby mode is very technically difficult.

Advantageously, various embodiments of the present disclosure may overcome various disadvantages of prior systems and methods. The vehicle gateway device gathers vehicle metric data from the vehicle (e.g., every millisecond). The gathered metric data can be bucketed and aggregated over time, and periodically (e.g., every 5 minutes) the bucketed data, along with location data and other data related to the vehicle, can be transmitted to a management server. The vehicle gateway device can be placed into a standby mode in order to reduce the power consumed by the vehicle gateway device. The vehicle gateway device may enter the standby mode based on a lack of input for a period of time from an accelerometer, a vehicle battery, and/or a vehicle computer. The vehicle gateway device may exit the standby mode based on receiving input from an accelerometer, a vehicle battery, and/or a vehicle computer. When in the standby mode, the vehicle gateway device can maintain a Long-Term Evolution ("LTE") network connection with the management server by sending keep alive packets such that the vehicle gateway device can respond to requests from the management server in a timely manner. As the vehicle gateway device is maintaining the connection with the management server, the management server can request data at any time from the vehicle gateway device while the vehicle gateway device is in standby mode.

The management server transmits data requests to the vehicle gateway device over the maintained data connection. The data requests may include a request for particular vehicle metrics, a request to implement debugging, a request for log data, etc. The vehicle gateway device can receive the data requests and respond to the management server in a timely manner. In order to reduce the power consumed to maintain the data connection in the standby mode, the vehicle gateway device can increase a keep alive interval such that the interval between the keep alive packets is increased. Further, in order to maintain the power consumed by the vehicle gateway device when in the standby mode, the polling interval of the accelerometer can be increased, the server can be turned off, WiFi can be turned off, the recording of log data can be reduced or turned off, Network Time Protocol requests may not be transmitted, the activity of network managers can be reduced, and the triggering of Garbage Collection can be reduced. Therefore, the connection between the vehicle gateway device and the management server can be maintained when the vehicle gateway device is in a standby mode without significantly increasing power usage.

According to various embodiments of the present disclosure, a vehicle gateway device can receive, over a period of time, raw vehicle data via a vehicle interface with a vehicle. An example period of time could be one, two, or five minutes. Example vehicle interfaces can include, but are not limited to, J1939 or OBD2. The vehicle gateway device can determine vehicle metrics from the raw vehicle data.

Example vehicle metrics can include or be related to fuel level, engine RPM, traveling speed, traveling distance, traveling time, accelerator use/position, brake use, cruise control use, coasting, idling, etc. The vehicle gateway device can determine corresponding vehicle metric buckets for each of the vehicle metrics. In the case of an engine RPM metric, example buckets can include a 0-800 RPM bucket, an 800-1700 RPM bucket, and a greater than 1700 RPM bucket. In the case of a cruise control metric, example buckets can include a cruise-control "on" bucket and a cruise-control "off" bucket. In various implementations, other buckets/ranges maybe used for engine RPM, cruise control, and/or any other metrics. Further, in various implementations the buckets/ranges for any of the metrics may be configurable or customizable by a user, and/or the buckets/ranges for any of the metrics may be determined or customized by the system based on a characteristic of the vehicle (e.g., a type of the vehicle, a make of the vehicle, a model of the vehicle, and/or the like). Additional example vehicle metric buckets are described in further detail below. The vehicle gateway device can aggregate, over the period of time, the vehicle metrics into the corresponding vehicle metric buckets to generate aggregated bucketed vehicle metric data. In the engine RPM metric example with a time period of five minutes, the vehicle gateway device can aggregate one minute and thirty seconds in the 0-800 RPM bucket and the remaining time in the 800-1700 RPM bucket. In response to determining that an aggregation time threshold is met, the vehicle gateway device can transmit, to a receiving server system, the aggregated bucketed vehicle metric data.

According to various embodiments of the present disclosure, a system can include a vehicle gateway device and a computing device (e.g., a management server, a receiving server system). The vehicle gateway device can be configured to gather and transmit vehicle metric data associated with a first vehicle. The computing device can be configured to receive vehicle metric data from vehicle gateway devices associated with respective vehicles via a network connection. The computing device determine various vehicle data from the vehicle metric data (e.g., fuel/energy usage of the plurality of vehicles over various periods of time). Further, the computing device can determine correlations among one or more other vehicle metrics and the fuel/energy usage of the plurality of vehicles over the various periods of time. The computing device can determine weightings of the one or more other vehicle metrics based at least in part on the determined correlations. The computing device can receive, from the vehicle gateway device, the vehicle metric data associated with the first vehicle. The computing device can determine, based on the determined weightings and the vehicle metric data, a fuel/energy efficiency score associated with the first vehicle. The computing device can cause the fuel/energy efficiency score to be provided in an alert, report, or interactive graphical user interface.

The computing device can request vehicle metric data from a particular vehicle gateway device via a network connection. For example, a user associated with the computing device may request data associated with a particular vehicle, and, in response, the computing device can request vehicle metric data from the vehicle gateway device associated with the particular vehicle. In response to receiving the request, the vehicle gateway device can provide stored vehicle metric data and/or current vehicle metric data to the computing device.

According to various embodiments of the present disclosure, a system can include a vehicle gateway device and a receiving server system. The vehicle gateway device can be configured to initiate a network connection with the receiving server system. The vehicle gateway device can maintain a first power mode. Power consumption of the vehicle gateway device at the first power mode can correspond to a first power level. The vehicle gateway device can enter a second power mode. Power consumption of the vehicle gateway device at the second power mode can correspond to a second power level. The second power level may be less than the first power level. In response to entering the second power mode, the vehicle gateway device can reduce activity of the vehicle gateway device. The vehicle gateway device can maintain the network connection with the receiving server system. Maintaining the network connection may include transmitting a keep alive message between the vehicle gateway device and the receiving server system. The vehicle gateway device can obtain a message from the receiving server system using the network connection. In response to obtaining the message from the receiving server system, the vehicle gateway device can enter the first power mode. The vehicle gateway device can transmit, to the receiving server system, a response to the system.

According to various embodiments of the present disclosure, a system can include a vehicle gateway device and a receiving server system. The vehicle gateway device can be configured to initiate a Long-Term Evolution network connection with the receiving server system. The vehicle gateway device can maintain a first power mode. Power consumption of the vehicle gateway device at the first power mode can correspond to a first power level. The vehicle gateway device can enter a second power mode. Power consumption of the vehicle gateway device at the second power mode can correspond to a second power level. The second power level may be less than the first power level. In response to entering the second power mode, the vehicle gateway device reduce activity of the vehicle gateway device. The vehicle gateway device can maintain the Long-Term Evolution network connection with the receiving server system. Maintaining the Long-Term Evolution network connection with the receiving server system may include transmitting a keep alive message between the vehicle gateway device and the receiving server system. The vehicle gateway device can obtain a request for a vehicle metric from the receiving server system using the Long-Term Evolution network connection. In response to obtaining the request for the vehicle metric, the vehicle gateway device can enter the first power mode. The vehicle gateway device can transmit, to the receiving server system, the vehicle metric.

In various embodiments, the vehicle gateway device, to reduce the activity of the vehicle gateway device, at the second power mode, can sample an accelerometer at a second rate. The vehicle gateway device, at the first power mode can sample the accelerometer at a first rate. The first rate may be greater than the second rate.

In various embodiments, the second power mode may be a standby power mode.

In various embodiments, the vehicle gateway device, to transmit the keep alive message between the vehicle gateway device and the receiving server system, can receive a first keep alive message from the receiving server system. The vehicle gateway device can transmit a second keep alive message to the receiving server system. The vehicle gateway device can receive an acknowledgment from the receiving server system.

In various embodiments, the vehicle gateway device, to transmit the keep alive message between the vehicle gateway device and the receiving server system, can receive a keep alive message from the receiving server system. The vehicle gateway device can transmit an acknowledgment to the receiving server system.

In various embodiments, the response to the message comprises a vehicle metric. The vehicle metric may be associated with at least one of cruise control, coasting, accelerator pedal, idling, anticipation, engine rotations per minute, motor rotations per minute, or motor power. Each vehicle metric may be associated with a vehicle metric bucket. The vehicle metric buckets associated with cruise control can include at least: cruise control on, and cruise control off. The vehicle metric buckets associated with coasting can include at least: coasting true, and coasting false. The vehicle metric bucket of coasting true can be determined when each of the following is true: engine torque is zero, vehicle speed is greater than zero, brake pedal is not engaged, and accelerator pedal is not engaged. The vehicle metric buckets associated with the accelerator pedal can include at least: accelerator pedal engagement over 95 percent, and accelerator pedal engagement less than or equal to 95 percent. The vehicle metric bucket of accelerator pedal engagement over 95 percent can be determined based on at least one of: engine torque, or engine load. The vehicle metric buckets associated with idling can include at least: idle true, and idle false. The vehicle metric buckets associated with anticipation can include at least: any brake event, and quick brake event. The vehicle metric bucket of quick brake event can be determined when the accelerator pedal is disengaged and the brake pedal is subsequently engaged in approximately less than one second. The vehicle metric buckets associated with engine rotations per minute (RPM) can include at least one of: an RPM band of approximately 800-1700 RPM, or an RPM band starting from a low of approximately 700-900 RPM to a high of approximately 1600-1800 RPM. The vehicle metrics can include at least accelerator pedal engagements over 95 percent and quick brake events. Quick brake events can be determined when the accelerator pedal is disengaged and the brake pedal is subsequently engaged in approximately less than one second.

In various embodiments, the vehicle gateway device, to reduce the activity of the vehicle gateway device, at the second power mode, can deactivate a server of the vehicle gateway device.

In various embodiments, the vehicle gateway device, to reduce the activity of the vehicle gateway device, at the second power mode, can block log pushes.

In various embodiments, the vehicle gateway device, to reduce the activity of the vehicle gateway device, at the second power mode, can eliminate network time protocol ("NTP") requests.

In various embodiments, the vehicle gateway device, to reduce the activity of the vehicle gateway device, at the second power mode, can reduce computing operations of the vehicle gateway device.

In various embodiments, the vehicle gateway device can transmit the keep alive message between the vehicle gateway device and the receiving server system based at least in part on a keep alive interval.

In various embodiments, the vehicle gateway device can transmit the keep alive message between the vehicle gateway device and the receiving server system based at least in part on a 120 second keep alive interval.

In various embodiments, the keep alive message is a first keep alive message. The vehicle gateway device can transmit the first keep alive message between the vehicle gateway device and the receiving server system based at least in part on a first keep alive interval. The vehicle gateway device can transmit a second keep alive message between the vehicle gateway device at the first power mode and the receiving server system based on a second keep alive interval.

In various embodiments, the second keep alive interval is less than the first keep alive interval.

In various embodiments, the vehicle gateway device can enter the second power mode based at least in part on not receiving input for a period of time from one or more of an accelerometer, a vehicle battery, or a vehicle computer.

In various embodiments, the message from the receiving server system can include a request for a vehicle metric and the response to the message may include the vehicle metric.

In various embodiments, the network connection is a Long-Term Evolution network connection.

In various embodiments, the vehicle gateway device can obtain raw vehicle data and decode or translate the raw vehicle data based at least in part on rules specifically related to the vehicle. The vehicle gateway device can store the decoded or translated raw vehicle data as vehicle metrics.

According to various embodiments of the present disclosure, a system can include a computing device. The system can further include a vehicle gateway device. The computing device and/or the vehicle gateway device can include a computer readable storage medium having program instructions embodied therewith; and one or more processors configured to execute the program instructions to cause the computing device to perform any of the aspects described above and/or below.

The vehicle gateway device can be configured to transmit charge records associated with a battery from a vehicle. The computing device can be configured to receive charge records for the battery, where each record from the plurality of charge records can include: (i) a start state of charge, (ii) an end state of charge, and (iii) an amount of energy charged. The computing device can determine a customized charge estimate function for the battery based at least in part on the start state of charge, the end state of charge, and the amount of energy charged for the plurality of charge records for the battery. The computing device can receive an approximate start time for a current charge of the battery, a last state of charge for the battery, and a current time. While the vehicle gateway device is unable to transmit vehicle battery data associated with the current charge of the battery, computing device can calculate an estimated charge time from at least the approximate start time and the current time; estimate a current state of charge based at least in part on: the last state of charge, the estimated charge time, and the customized charge estimate function for the battery; and cause presentation of the current state of charge in a graphical user interface.

The vehicle gateway device can be configured to transmit historical vehicle battery data associated with a battery from a vehicle. The computing device can be configured to receive the historical vehicle battery data. The computing device can determine, from the historical vehicle battery data, (i) data indicative of an amount of energy charged relative to a capacity of the battery and (ii) an amount of energy charged relative to a period of time. The computing device can determine a customized charge estimate function for the battery based at least in part on (i) the data indicative of the amount of energy charged relative to the capacity of the battery and (ii) the amount of energy charged relative to the period of time. The computing device can receive an approximate start time for a current charge of the battery, a last state of charge for the battery, and a current time. While the vehicle gateway device is unable to transmit vehicle battery data associated with the current charge of the battery, computing device can calculate an estimated charge time from at least the approximate start time and the current time; estimate a current state of charge based at least in part on: the last state of charge, the estimated charge time, and the customized charge estimate function for the battery; and cause presentation of the current state of charge in a graphical user interface.

According to various embodiments of the present disclosure, a method can include initiating a network connection with a receiving server system. The method can further include maintaining a first power mode. Power consumption of a vehicle gateway device at the first power mode can correspond to a first power level. The method can further include entering a second power mode. Power consumption of the vehicle gateway device at the second power mode can correspond to a second power level. The second power level may be less than the first power level. The method can further include, in response to entering the second power mode, reducing activity of the vehicle gateway device. The method can further include maintaining the network connection with the receiving server system. Maintaining the network connection can include transmitting a keep alive message between the vehicle gateway device and the receiving server system. The method can further include obtaining a message from the receiving server system using the network connection. The method can further include, in response to obtaining the message from the receiving server system, entering the first power mode. The method can further include transmitting, to the receiving server system, a response to the message.

In various embodiments, a receiving server system may frequently request data from a vehicle gateway device in a standby power mode, and the data may be provided to the receiving server system in a timely and efficient manner. Thus, in some embodiments, the systems, devices, configuration capabilities, and the like described herein are more efficient as compared to previous systems, etc.

Various embodiments of the present disclosure provide improvements to various technologies and technological fields, and practical applications of various technological features and advancements. Some existing systems are limited in various ways, and various embodiments of the present disclosure provide significant improvements over such systems, and practical applications of such improvements. For example, existing diagnostic systems can enter a standby power mode that results in the diagnostic system being disconnected from a management server (e.g., the diagnostic system is asleep) for extended periods of time (e.g., six hours). Existing diagnostic systems may be incapable of responding to requests for generated data from the management server while disconnected from the management server. Responding to requests for the generated data once every six hours can be impractical and can lead to system bottlenecks. Rather, as described herein, the techniques and solutions of the present disclosure can overcome the issue(s) by maintaining a network connection between the diagnostic system and the management server while the diagnostic system is in a standby power mode (e.g., without substantially increasing the power consumption of the diagnostic system in the standby power mode). Maintaining the network connection between the diagnostic system and the management server can improve computer and/or network performance. As another example, some existing systems are unable to maintain a network connection with the management server while maintaining a standby power mode because the maintenance of the network connection can rely on various peripherals that may not be ordinarily active in a standby power mode. Thus, in some existing systems, in order to maintain the network connection with the management server, the diagnostic system may be incapable of remaining in the standby power mode and may enter a standard power mode. An improved system can address this technical limitation by reducing a number of active peripherals and/or reducing the activity of the active peripherals in a standby power mode. Thus, the system can maintain a standby power mode while maintaining a network connection with the management server.

Additionally, various embodiments of the present disclosure are inextricably tied to, and provide practical applications of, computer technology. In particular, various embodiments rely on maintenance of a network connection between a diagnostic system and a management server, maintenance of a standby power mode, and a reduction of activity of the diagnostic system based on the standby power mode. Such features and others are intimately tied to, and enabled by, computer, vehicle diagnostic, and vehicle gateway technology, and would not exist except for computer, vehicle diagnostic, and vehicle gateway technology. For example, the vehicle reporting and management functionality described below in reference to various embodiments cannot reasonably be performed by humans alone, without the computer and vehicle gateway technology upon which they are implemented. Further, the implementation of the various embodiments of the present disclosure via computer technology enables many of the advantages described herein, including more efficient interaction with, and presentation and analysis of, various types of electronic data, including fleet management data, and the like.

Further, by virtue of electronic communication with vehicle diagnostic systems and devices, various embodiments of the present disclosure are inextricably tied to, and provide practical applications of, computer vehicle technology. For example, the vehicle gateway devices described herein connect to vehicles via protocol(s), such as Controller Area Network (CAN), Local Interconnect Network (LIN), OBD-II or OBD2, and/or J1939. Moreover, the data collected is inherently tied to vehicles, such as, as fuel level, engine revolutions per minute (RPM), speed, engine torque, engine load, brake use, etc. Various embodiments rely on interpreting and processing the raw vehicle data. Accordingly, some of the solutions and techniques described herein are intimately tied to, and enabled by, computer, vehicle diagnostic, and vehicle gateway technology, and would not exist except for computer, vehicle diagnostic, and vehicle gateway technology.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the aboveand/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
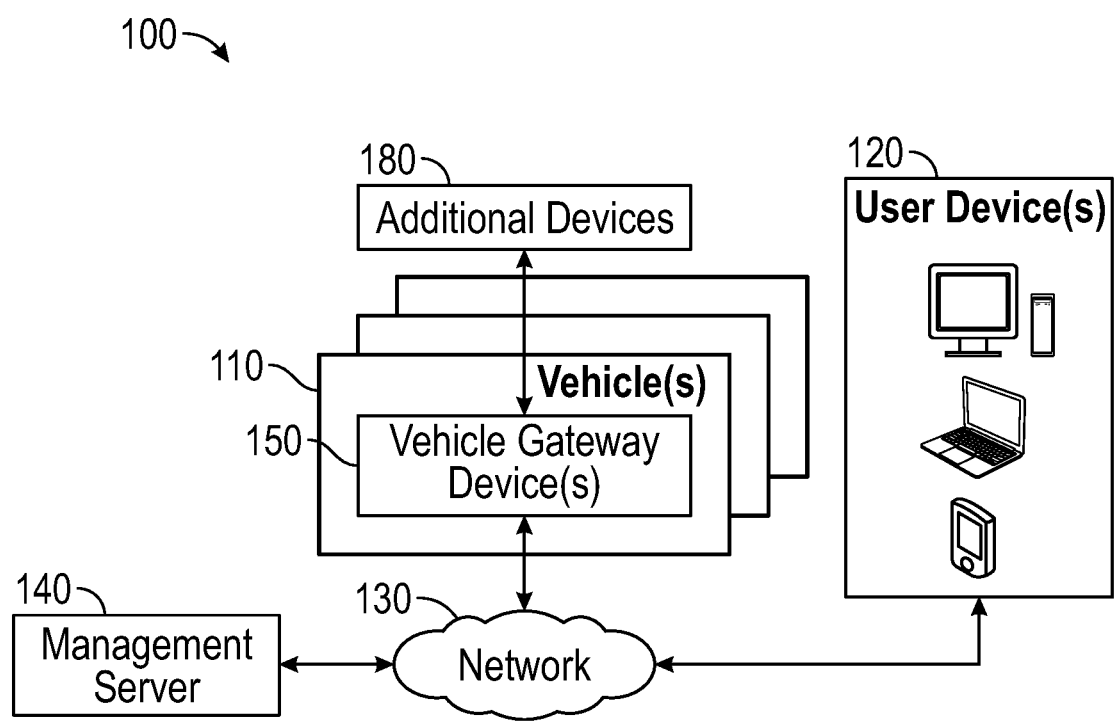
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments of the present disclosure, an improved system can efficiently receive vehicle metric data and analysis of the vehicle metric data can be used for fleet management. A vehicle gateway device that is connected to a vehicle can receive metric data for the vehicle. Generally, the vehicle gateway device can gather data related to operation of the vehicle, location data, and/or other data related to the vehicle. The system can receive data from multiple vehicles in a fleet via respective gateway devices. The vehicle gateway device can gather vehicle metric data at a high frequency, such as every millisecond. Accordingly, the vehicle gateway device can gather a relatively large amount of data. In some embodiments, instead of transmitting a relatively large amount of vehicle metric data at a relatively fine-level of granularity, the vehicle gateway device can aggregate and bucket the vehicle metric data over a period of time (such as, every five minutes). The vehicle gateway device can transmit the aggregated and/or bucketed data to a management server, which can be faster and/or can use less network bandwidth than transmitting vehicle metric data at the relatively fine-level of granularity.

The vehicle gateway device can transmit the aggregated and/or bucketed data to a management server in response to a request received from a management server. The management server may transmit a request to the vehicle gateway device for particular aggregated and/or bucketed data (e.g., data corresponding to a particular vehicle, a particular time region, a particular vehicle component, a particular vehicle matric). The vehicle gateway device can receive the requests from the management server via a network connection while the vehicle gateway device is in a full power mode. At a full power mode, the vehicle gateway device can consume a first amount of power and, at a standby power mode, the vehicle gateway device can consume a second amount of power that is less than the first amount of power. In order to enter a standby power mode, the vehicle gateway device, can deactivate and/or reduce the activity of one or more peripherals (e.g., in order to reduce the power consumed by components and/or peripherals of the vehicle gateway device). In order to receive requests from the management server via the network connection while the vehicle gateway device is in a standby power mode, the vehicle gateway device, at the standby power mode, can maintain the network connection. In particular, the vehicle gateway device can periodically maintain a network connection with the management server in order to receive requests from the management server while the vehicle gateway device is in a standby power mode. As described herein, the vehicle gateway device can transmit keep alive messages based on a keep alive interval in order to maintain the network connection. Based on the maintained connection, the management server can receive data in a timely and efficient manner.

In order to maintain the second amount of power that is consumed by the vehicle gateway device at the standby power mode, the vehicle gateway device can further deactivate or reduce the activity of one or more peripherals. For example, the vehicle gateway device can block log pushes, eliminate network time protocol requests, deactivate a server of the vehicle gateway device, reduce computing operations of the vehicle gateway device, reduce a sampling rate of an accelerometer.

Data received from the vehicle gateway device can be used for fleet management purposes. In particular, the management server can receive data from respective vehicle gateway devices for many vehicles and over extended periods of time. As described herein, the management server can aggregate and process the received data in various ways. For example, the management server can process the data per vehicle, per vehicle characteristic, per driver, per driver characteristic, per fleet, per cohort, and/or based on some other common characteristic. The management server can use the data to determine vehicle fuel/energy efficiencies, correlations among vehicle metrics and fuel/energy efficiency, a fuel/energy efficiency score, safety measurements, correlations among vehicle metrics and safety measurements, and/or a safety score. Additionally or alternatively, the management server can determine comparisons, trends, correlations, recommendations, route optimizations, and/or otherwise use the data for fleet management purposes. Further, the management server can generate reports, alerts, and various interactive graphical user interfaces from the data.

In various embodiments, the vehicle gateway devices may be configured to automatically connect to a remote management server (e.g., a "cloud"-based management server), and may offload received, aggregated, and/or analysis data to the remote management server via wired or wireless communications. A remote management server can also be referred to herein as a "management server." A remote management server can also be referred to as a "remote server." The vehicle gateway devices may further communicate with the management server to provide substantially real-time and/or historical information from the vehicle gateway device. In various embodiments, the management server may aggregate received data and/or analysis data from one or more vehicle gateway devices, and provide statuses, alerts, analyses, etc. that may be accessed via user computing devices.

Various aspects of the present disclosure may individually and/or collectively provide various technical advantages as described herein, and may overcome various disadvantages of prior systems and methods. As described herein, embodiments of the present disclosure may include vehicle gateway devices. The vehicle gateway devices may automatically establish communication with a remote management server and may transmit vehicle data to the remote management server. Such received data may be useable by the management server for providing further analyses, insights, alerts, etc. to users. However, some existing systems that locally connect to and monitor a vehicle are incapable of receiving data from the vehicle gateway device when the vehicle gateway device is in a standby power mode, which can be impractical when the data is needed in substantially real-time. For example, the vehicle gateway device, when in the standby power mode, may take a substantial period of time (e.g., six hours) to respond to a request for data. Instead, in some embodiments, the vehicle gateway device can maintain a network connection with the management server and transmit the requested data substantially in a timely manner (e.g., ten minutes). Accordingly, the management server can efficiently obtain requested data while the vehicle gateway device is in a. standby power mode.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV)

files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Vehicle Metric Data: Any data that can describe an aspect of a vehicle or something related to a vehicle. Example vehicle metric data can be related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle. Vehicle metric data does not necessarily have to be represented as a numerical value. For example, example vehicle metric data related to cruise control can indicate whether cruise control is either in an on or off state. Individual vehicle metrics can be associated with respective timestamps. As another example, a vehicle metric can be for coasting. The determination of whether the vehicle metric for coasting is either true or false can be based on a combination of vehicle parameters, such as engine torque, vehicle speed, brake pedal engagement, and/or accelerator pedal engagement. In some embodiments, some categories of vehicle metric data can come from diagnostic data that directly comes from the vehicle bus. Additional or alternatively, some vehicle metric data can be a composite of multiple vehicle parameters and/or be derived from another vehicle metric, such as, for example, coasting that can be derived from multiple parameters or accelerator pedal engagement that can be derived from engine torque and/or load, as described herein.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, one or more vehicles 110, one or more vehicle gateway devices 150, and one or more additional devices 180. The various devices may communicate with one another via a communications network 130, as illustrated.

In general, the vehicle gateway device 150 comprises a housing including processor(s), memory, input/output ports, etc. that may be connected to components of a vehicle. For example, the vehicle gateway device 150 can interface with a vehicle bus of the vehicle 110. In particular, the vehicle gateway device 150 can connect to the vehicle bus of the vehicle 110 over an interface, such as, but not limited to, OBD-II or J1939. The vehicle gateway device 150 can receive and/or process data received via the interfaces of the vehicle gateway device 150. The vehicle gateway device 150 can include or be configured to be an electronic logging device (ELD). Accordingly, the vehicle gateway device 150 can record data regarding the operation of the vehicle 110, as well as driver activity including driver hours of service and record of duty status. Configurations of the vehicle gateway device 150 may include various analysis algorithms, program instructions, scripts, etc., as described herein. Additional details regarding the vehicle gateway device 150 are described in further detail herein, such as with respect to FIG. 3.

The vehicle gateway device 150 can store the received and/or processed data in a memory of the vehicle gateway device 150 (e.g., a computer readable storage medium). The vehicle gateway device 150 can communicate with the management server 140 over the network 130. In particular, the vehicle gateway device 150 can transmit the received and/or processed data to the management server 140. As another example, the vehicle gateway device 150 can transmit an alert to the management server 140. The management server 140 may thereby receive data from multiple vehicle gateway devices 150, and may aggregate and perform further analyses on the received data from vehicle gateway devices 150. In some embodiments, the vehicle gateway device 150 can receive updates from the management server 140.

In some embodiments, the features and services provided by the management server 140 may be implemented as web services consumable via the network 130. The management server 140 can be provided by one or more virtual machines implemented in a hosted computing environment. The hosted computing environment can include one or more rapidly provisioned and released computing resources. The computing resources can include computing, networking and/or storage devices.

The additional device(s) 180 may include various devices for monitoring a vehicle and/or vehicle-related activity. The additional device(s) 180 can be optional and some configurations of the environment 100 do not include any additional device(s) 180. Example additional device(s) 180 can include, but are not limited to, cameras (such as network-connected dash cams) and/or sensors. Example sensors can include, but are not limited to, wireless sensors to monitor reefers and cargo and wireless temperature sensors. Another additional device 180 can include a device that identifies a particular driver. For example, a driver can wear a keychain that automatically is wirelessly communicates with the vehicle gateway device 150 such that the driver can be automatically identified and the driver does not need to sign in to an application.

Various example user devices 120 are shown in FIG. 1, including a desktop computer, laptop, and a smartphone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140) via the user device(s) 120. Such interactions may typically be accomplished via interactive graphical user interfaces; however, alternatively such interactions may be accomplished via command line and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, an LTE network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the vehicle gateway devices 150 may communicate the additional device(s) 180, the management server 140, and/or the user device(s) 120 via any combination of the network 130 or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

IV. Example Management Device/Server

Figure 2:
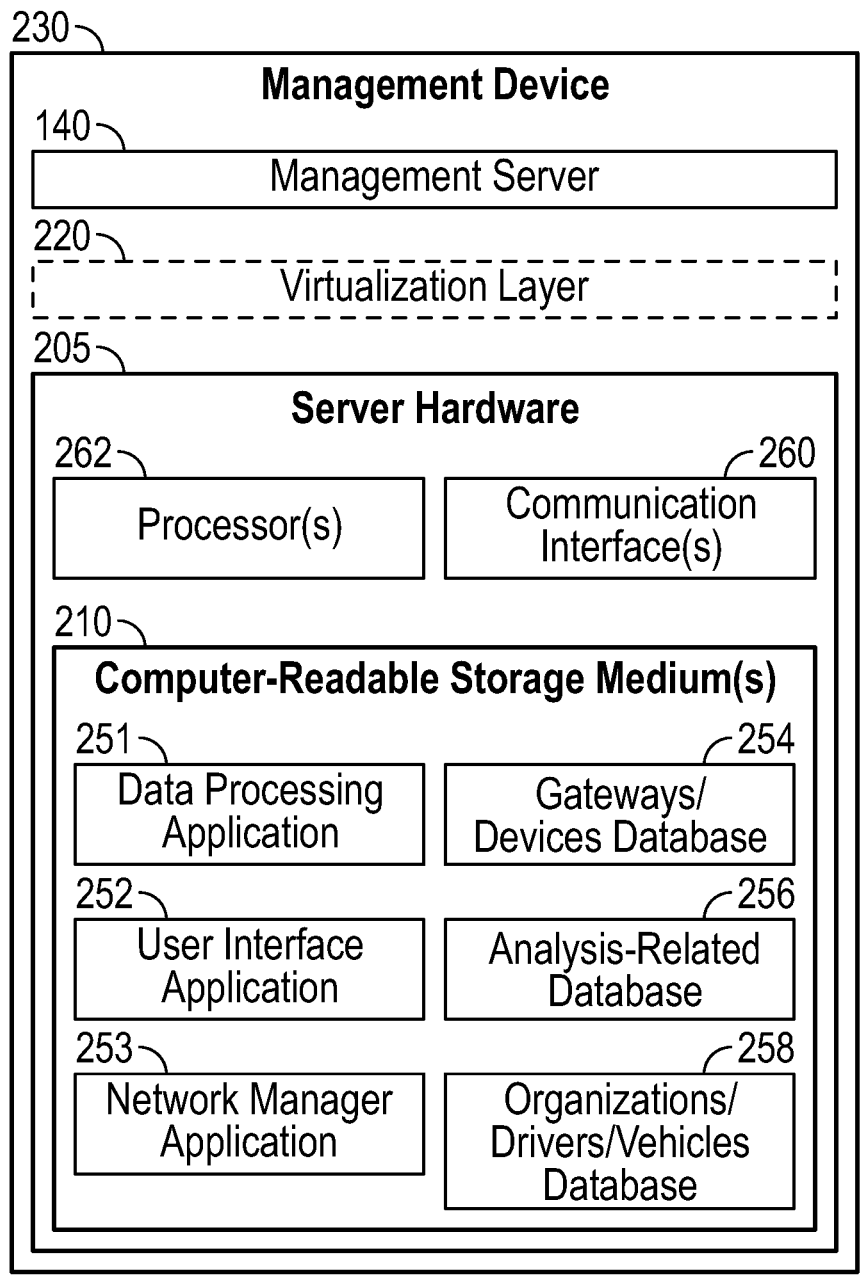
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, the management device 230 includes the management server 140. The management server 140 can be a Web or cloud server and/or a cluster of servers, running on one or more sets of server hardware. In some embodiments, the management server 140 works for both single and multi-tenant installations, meaning that multiple organizations with different administrators may have, e.g., multiple gateway devices and additional devices managed by the same management server.

According to various embodiments, the management server 140 may be implemented on the management device 230 (or multiple devices similar to the management device 230), which includes server hardware 205. The server hardware 205 can include one or more communication interfaces 260, one or more processors 262, and one or more computer readable storage mediums 210, each of which may be in communication with one another. The computer readable storage medium 210 can includes a data processing module 251, user interface module 252, network manager module 253, gateways/devices database 254, analysis-related database 256, and organizations/drivers/vehicles database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the vehicle gateway device 150, the additional device(s) 180, and/or the user device(s) 120 via any combination of the network 130 or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

In operation, the data processing module 251 can process and analyze data (e.g., data received from the various devices, including the gateway devices and/or additional devices) as described herein. The data processing/analysis may usefully provide insights and information that may be provided via various interactive graphical user interfaces, as described herein.

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., gateway devices and additional devices), and manage, and access data associated with, those devices as described herein. As another example, the user interface module 252 may provide various network accessible interactive graphical user interfaces, e.g., to allow the analysts of the various organizations and devices to conduct operations analysis and/or operations configurations, as described herein.

In operation, the network manager module 253 may provide communication with and configuration and management of the various devices associated with each organization. This may include, for example, receiving and managing information related to the various devices (e.g., gateway devices and additional devices) at the time of manufacture, associating devices with particular organizations when they are purchased/claimed and implemented by the organizations (e.g., the claiming may be performed at least in part by populating the gateways/devices database 254 and the organizations/drivers/vehicles database 258 with appropriate information when the devices are associated with an organization), receiving data from the various devices (e.g., and storing the data in the gateways/devices database 254 or other appropriate database), sending data to various devices, and/or the like.

In operation, the gateways/devices database 254 can store information regarding the vehicle gateway devices 150 and/or the additional devices 180, and various relationships and associations among these devices. For example, the gateways/devices database 254 can store identifiers associated with these devices.

In operation, the analysis-related database 256 can store data (such as raw data, aggregated data, and/or analysis data) received from the vehicle gateway devices 150 and/or the additional devices 180. The analysis-related database 256 can further store processed data that is generated by the management server 140 for analysis purposes. The analysis data can include vehicle fuel/energy efficiencies, correlations among vehicle metrics and fuel/energy efficiencies, fuel/energy efficiency scores, safety measurements, correlations among vehicle metrics and safety measurements, safety scores, comparisons, trends, correlations, recommendations, and/or route optimizations.

In operation, the organizations/drivers/vehicles database 258 can store information regarding the organizations to which the vehicle gateway devices 150 and/additional devices 180 belong. The organizations/drivers/vehicles database 258 can store data regarding the drivers and/or vehicles associated with the organization.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security module used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization—represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment." As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Vehicle Gateway Device

Figure 3:
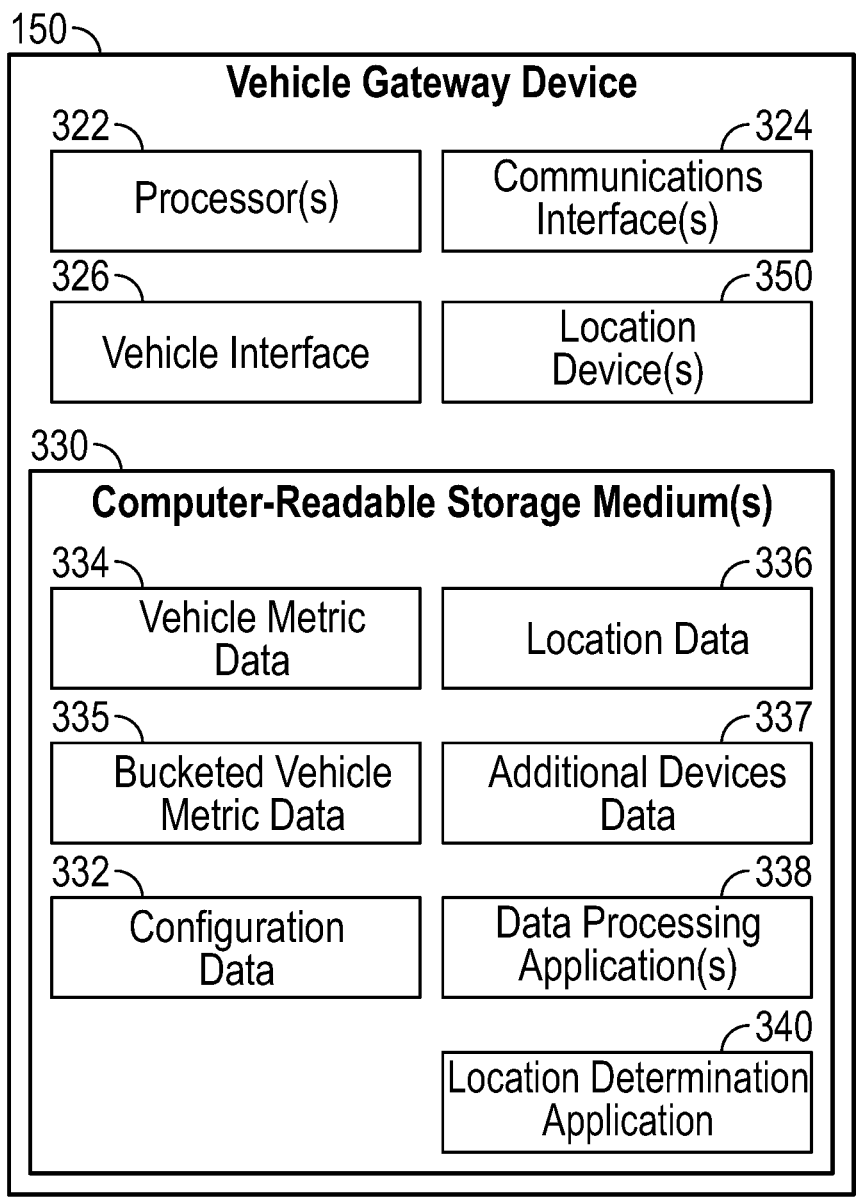
FIG. 3 illustrates a block diagram of an example vehicle gateway device, according to various embodiments of the present disclosure.

FIG. 3 illustrates a block diagram of an example vehicle gateway device 150, according to various embodiments of the present disclosure. The vehicle gateway device 150 can include one or more processors 322, one or more communication interfaces 324, one or more vehicle interfaces 326, location device(s) 350, and one or more computer readable storage mediums 330, each of which may be in communication with one another. The computer readable storage medium(s) 330 can include configuration data 332, vehicle metric data 334, bucketed vehicle metric data 335, location data 336, additional devices data 337, data processing module(s) 338, and location determination module 340. The configuration data 332, vehicle metric data 334, bucketed vehicle metric data 335, location data 336, additional devices data 337 can be stored in one or more databases of the vehicle gateway device 150. In various implementations one or more buses, interconnects, wires/cables, etc. may be used to interconnect the various components of the vehicle gateway device 150, and of the vehicle gateway device 150 more generally.

In operation, the one or more communication interfaces 324, one or more processors 322, and one or more computer readable storage mediums 330 communicate with one another to, e.g., execute by the processor(s) 322 computer program instructions (e.g., as provided by the data processing module(s) 338); receive, access, and transmit data (e.g., via the communication interface(s) 324); and/or the like. Example processor(s) 322 can include various types of processors, such as, but not limited to, general purposes processors, e.g., a microprocessor, and/or special purposes processors, e.g., Graphics Processing Units ("GPUs"), Application Specific Integrated Circuits ("ASICs"), Field-Programmable Gate Arrays ("FPGAs"). Further implementation details are described below.

The communication interface(s) 324 can enable wired and/or wireless communications with other devices and networks, as described herein. For example, the vehicle gateway device 150 can communicate with the additional device(s) 180, the management server 140, and/or the user device(s) 120 via any combination of the network 130 or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces (APIs).

The vehicle interface 326 can communicate with a vehicle bus. As described herein, the vehicle bus is an internal communications network that connects components, such as a car's electronic controllers, within a vehicle. Example protocols that the vehicle interface 326 can communicate with can include, but are not limited to, Controller Area Network (CAN), Local Interconnect Network (LIN), OBD-II or OBD2, and/or J1939. Accordingly, the vehicle interface 326 can allow access to the vehicle's electronic controllers. The vehicle gateway device 150, via the vehicle interface 326, can access vehicle diagnostics, such as fuel level, engine revolutions per minute (RPM), speed, engine torque, engine load, brake use, etc. In some embodiments, the vehicle gateway device 150, via the vehicle interface 326, can receive messages from the vehicle bus from the car's electronic controllers related to vehicle data, such as fuel level, engine revolutions per minute (RPM), speed, engine torque, engine load, brake use, etc. Additionally or alternatively, the vehicle gateway device 150, via the vehicle interface 326, can query the car's electronic controllers to receive vehicle data, such as fuel level, engine revolutions per minute (RPM), speed, engine torque, engine load, brake use, etc.

The location determination module 340 can use the location device(s) 350. Example location device(s) 350 can include a global positioning system (GPS) device or a global navigation satellite system (GLONASS) device. Data received from the location device(s) 350 can be stored as location data 336 in the computer readable storage medium(s) 330. In some embodiments, the location determination module 340 can determine the location of the vehicle gateway device 150 using various geolocation methods that use, but are not limited to, Wi-Fi, Bluetooth, Internet Protocol (IP), and/or proximity to beacons. The location determination module 340 may determine location of the gateway device 150 and generate location data 336 associated with the location of the gateway device 150. The location data 336 may include geographical positioning information (e.g., GPS coordinates or latitudinal and longitudinal coordinates) that may represent the location of the vehicle gateway device 150. Additionally or alternatively, the location information may identify an area within a grid (such as a map tile) that identifies and/or estimates the location of the vehicle gateway device 150.

In operation, the vehicle metric data 334 can include raw vehicle data received from the vehicle bus and/or the various additional devices 180 via the vehicle interface 326, communications interface(s) 324, and/or input ports of the vehicle gateway device 150. In operation, the bucketed vehicle metric data 334 can include aggregated metric data. In some embodiments, the data processing module 338 can bucket the raw vehicle data as aggregated data and can store the aggregated results as the bucketed vehicle metric data 334.

In operation, the additional devices data 337 can include data received from the various additional devices 180 via the vehicle interface 326, communications interface(s) 324, and/or input ports of the vehicle gateway device 150. Example additional devices data 337 can include, but is not limited to, camera data, video data, and/or temperature sensor data.

In operation, the configuration data 332 can include one or more configurations that configure operation of the vehicle gateway device 150. For example, such configurations may be received from a user and/or the management device 230 (and/or other devices in communication with the vehicle gateway device 150), and may include various communications specifications (e.g., that indicate functionality of the input and output ports), executable program instructions/code, algorithms or processes for processing the received data, and/or the like. The vehicle gateway device 150 may store multiple configurations in the configuration data 332, which may be selectively run or implemented, e.g., via user selection via the management server 140 and/or the user device(s) 120.

In operation, the data processing module(s) 338 can process and analyze received data. The processing and analysis by the data processing module(s) 338 may result in one or more outputs from the vehicle gateway device 150 that may be provided via the communications interface(s) 324, as further described herein. In various implementations, the data processing module(s) 338 may be executed by the processor(s) 322.

In various embodiments, firmware of the vehicle gateway device 150 may be updated such that the vehicle gateway device 150 may provide additional functionality. Such firmware updating may be accomplished, e.g., via communications with the management server 140, thereby enabling updating of multiple vehicle gateway devices 150 remotely and centrally. Additional functionality may include, for example, additional communications specifications, additional ways of communicating with additional devices 180

(e.g., additional control languages, etc.), additional configurations or options for configurations, and/or the like.

VI. Example Methods and Functionality for Efficient Data Aggregation

Figure 4A:
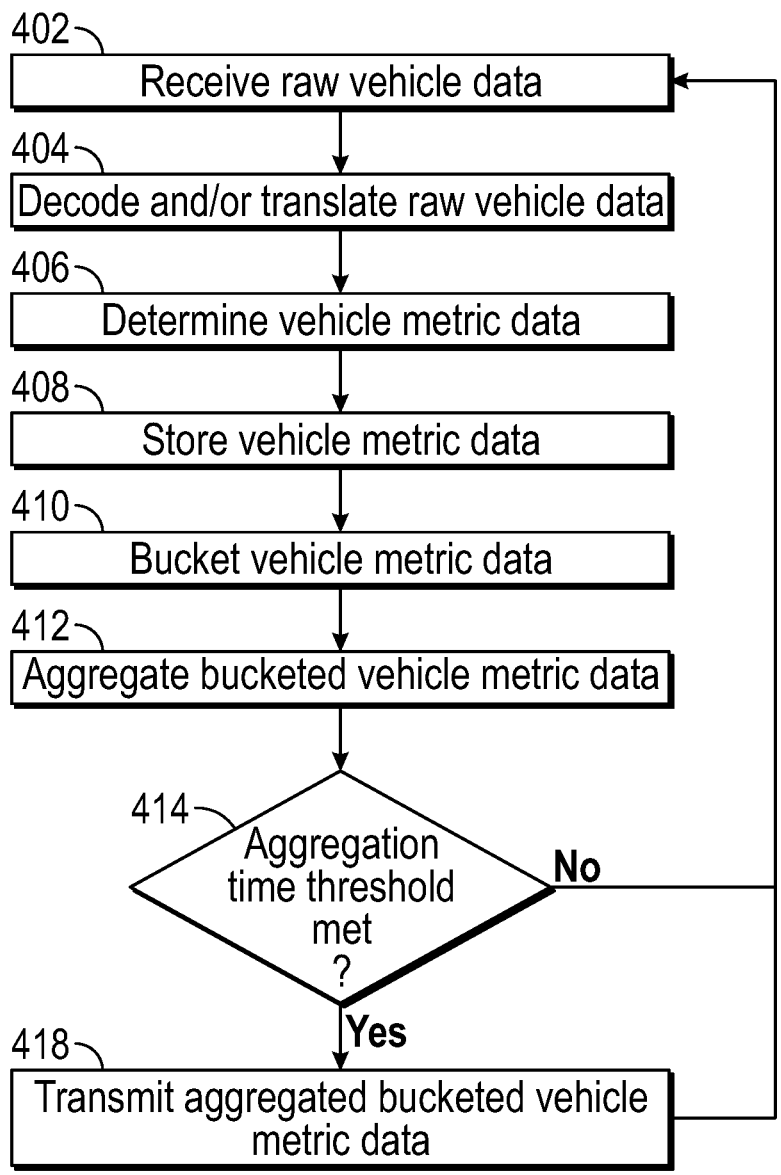
FIGS. 4A-4B are flowcharts illustrating example methods and functionality related to efficient data aggregation on a vehicle gateway device, according to various embodiments of the present disclosure.
Figure 4B:
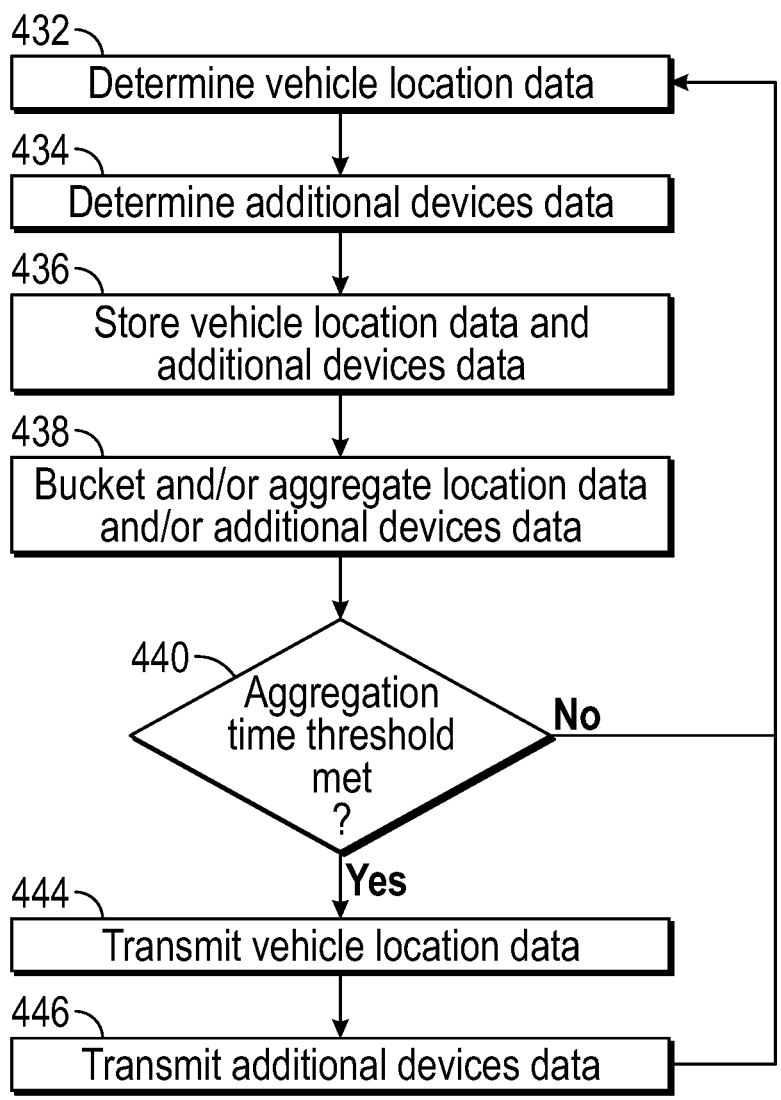

FIGS. 4A-4B are flowcharts illustrating example methods and functionality related to efficient data aggregation on a vehicle gateway device 150, according to various embodiments of the present disclosure. Turning to FIG. 4A, beginning at block 402, raw vehicle data can be received. In particular, the vehicle gateway device 150 can receive the raw vehicle data. The vehicle gateway device 150 can receive the raw vehicle data via the vehicle interface 326 with a vehicle 110. The vehicle gateway device 150 can communicate with electronic controllers of the vehicle 110 and/or the vehicle's computer over the vehicle interface 326 and the vehicle bus. The communication between the vehicle gateway device 150 and the vehicle 110 can use a particular communication protocol, such as OBD-II or J1939. In some embodiments, the vehicle gateway device 150 can record broadcasted data over the vehicle bus, thereby receiving the raw vehicle data. Additionally or alternatively, the vehicle gateway device 150 can request raw vehicle data over the vehicle bus. The raw vehicle data can be received over a period of time. As described herein, example raw vehicle data can include any vehicle diagnostic data, such as, but not limited to, data related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle 110.

In some embodiments, the vehicle gateway device 150 can receive vehicle battery data associated with a battery from the vehicle 110. The vehicle battery data can represent a state of the vehicle battery. The vehicle battery data can be for an electric vehicle, a hybrid vehicle (such as a plug-in hybrid electric vehicle), or internal combustion engine (ICE) vehicles. The vehicle gateway device 150 can listen for battery-related messages from a battery management system (BMS) of the vehicle 110. Additionally or alternatively, the vehicle gateway device 150 can request vehicle battery data from the battery management system.

At block 404, the raw vehicle data can be decoded and/or translated. In particular, the vehicle gateway device 150 can decode and/or translate the raw vehicle data. The raw vehicle data can be in a particular data format, such as an OBD-II or J1939 data format. Accordingly, the vehicle gateway device 150 can decode and/or translate the raw vehicle data in the particular data format. The vehicle gateway device 150 can decode and/or translate the raw vehicle data based at least in part on rules specifically related to the vehicle. For example, the vehicle gateway device 150 can include rules for decoding particular data formats, such as OBD-II or J1939. The vehicle gateway device 150 can use different sets of rules for decoding and/or translating data from a particular vehicle depending on the communication protocol that the particular vehicle uses. In some embodiments, the vehicle gateway device 150 can decode and/or translate vehicle battery data from messages from the battery management system (BMS). Additionally or alternatively, the vehicle gateway device 150 can store the raw vehicle data in its original data format.

At block 406, vehicle metric data can be determined. In particular, the vehicle gateway device 150 can determine vehicle metric data from the raw vehicle data. For example, the raw vehicle data regarding cruise control use, coasting, accelerator pedal use, idling, battery state, anticipation, motor rotations per minute, motor power, fuel level, engine revolutions per minute (RPM), speed, engine torque, engine load, brake use, etc. can be voluminous. The vehicle gateway device 150 can parse and organize the raw vehicle data into individual vehicle metrics. For example, a value and/or on/off state can be determined for each of cruise control use, coasting, accelerator pedal use, idling, battery state, anticipation, motor rotations per minute, motor power, fuel level, engine revolutions per minute (RPM), speed, engine torque, engine load, brake use, etc. over the period of time. Moreover, some example vehicle metrics can be based on a combination of vehicle parameters. For example, a vehicle metric can be for coasting. The vehicle gateway device 150 can determine the vehicle metric for coasting to be either true or false based on a combination of vehicle parameters, such as engine torque, vehicle speed, brake pedal engagement, and/or accelerator pedal engagement. In particular, the vehicle gateway device 150 can determine the vehicle metric for coasting to be true when each of the following are determined to be true: engine torque is zero, vehicle speed is greater than zero, brake pedal is not engaged, and accelerator pedal is not engaged.

Another example of determined vehicle metric can be for accelerator pedal engagement. In some embodiments, accelerator pedal data from the vehicle bus may be unreliable. Accordingly, the vehicle gateway device 150 can determine the vehicle metric for accelerator pedal engagement based on at least one of engine torque or engine load. For example, the vehicle gateway device 150 can determine the vehicle metric for accelerator pedal engagement as a percentage based value ranges for engine torque and/or engine load.

Yet another example of determined vehicle metric can be for anticipation. Anticipation can generally refer to driver behavior with respect to anticipating having to brake, which can be indicative of fuel/energy efficient driving. For example, those drivers that anticipate traffic in their driving will typically not have to brake as hard. The vehicle metric for anticipation can be a categorizations of brake events, such as, any brake event and/or a quick brake event. The vehicle gateway device 150 can determine the brake event category based on a combination of vehicle parameters, such as brake pedal engagement, accelerator pedal engagement, engine torque, and/or engine load. In particular, the vehicle gateway device 150 can determine the vehicle metric for a quick brake event when each of the following are determined: the accelerator pedal is disengaged and the brake pedal is subsequently engaged in approximately less than one second. Any brake event can include any time the driver presses the brake pedal.

At block 408, the vehicle metric data can be stored. In particular, the vehicle gateway device 150 can store the vehicle metric data in the computer-readable storage medium(s) 330. For example, the vehicle gateway device 150 can store the vehicle metric data in a database on the computer-readable storage medium(s) 330. As described herein, aggregated bucketed vehicle metric data may be generated by the vehicle gateway device 150 and transmitted to the management server 140. However, in some environments, the management server 140 may query the vehicle gateway device 150 for particular vehicle metric data, which can be retrieved from the computer-readable storage medium(s) 330.

At block 410, the vehicle metric data can be bucketed. In particular, the vehicle gateway device 150 can determine corresponding vehicle metric buckets for each of the vehicle metrics. In some embodiments, there can be a single bucket for a particular metric. As noted above, in various implementations, various buckets/ranges maybe used for the various metrics. Further, in various implementations the buckets/ranges for any of the metrics may be configurable or customizable by a user, and/or the buckets/ranges for any of the metrics may be determined or customized by the system based on an identify and/or characteristic of the vehicle (e.g., a type of the vehicle, a make of the vehicle, a model of the vehicle, and/or the like). One example category of buckets is an engine revolutions per minute (RPM) category. Example buckets for RPM can include RPM bands with RPM ranges for each band. Example RPM band buckets that may be applicable to a particular vehicle or a vehicle with a particular characteristic include a first bucket for an RPM band of approximately 800-1700 RPM and a second bucket for an RPM band starting from a low of approximately 700-900 RPM to a high of approximately 1600-1800 RPM. In some embodiments and vehicles, the RPM band of approximately 800-1700 RPM can be an efficient range for operating a vehicle with respect to fuel/energy use and the RPM bands starting from a low of approximately 700-900 RPM to a high of approximately 1600-1800 RPM can be inefficient ranges for operation of the vehicle with respect to fuel/energy use. The bucket of 800-1700 RPM can be considered a "green" RPM range for certain vehicles, meaning it is a generally efficient portion of the RPM band. Conversely, the other bucket(s) can be considered a "red" RPM range(s), for certain vehicles, meaning it is a generally less efficient portion of the RPM band. If the vehicle metric data includes RPM values of 798, 799, and 800 for each millisecond, respectively, then the 800 RPM value can be placed in the efficient RPM bucket and the 798 and 799 RPM values can be placed in the inefficient bucket. In some embodiments, the particular buckets can be customized for types of vehicles. For example, different types of vehicles can have different recommended RPM ranges for fuel/energy efficiency. The "green band" RPM range for different vehicle may vary by plus or minus 50 to 100 RPM, 100 to 150 RPM, or any other amount, depending on the particular vehicle or type of vehicle. Many of the vehicle metrics described herein can be useful indicators for fuel/energy efficient driving or the lack thereof.

Another example category of buckets is a cruise control category. Example buckets for cruise control can include a cruise control on bucket and a cruise control off bucket. For example, if the vehicle metric data includes instances of cruise control being on for timestamps 1 and 2 and cruise control being off for timestamp 3, then the first two instances can be placed in the cruise control on bucket and the remaining instance can be placed in the cruise control off bucket. Use of cruise control can increase or be indicative of fuel/energy efficient driving.

Yet another example category of buckets is a coasting category. Example buckets for coasting can include a coasting true bucket and a coasting false bucket. For example, if the vehicle metric data includes instances of coasting being true for timestamps 1 and 2 and coasting being false for timestamp 3, then the first two instances can be placed in the coasting true bucket and the remaining instance can be placed in the coasting false bucket. As described herein, the determination of whether coasting is true or false at a particular timestamp can be based on a number of vehicle parameters, such as engine torque, vehicle speed, brake pedal engagement, and/or accelerator pedal engagement. Similar to previous metrics, use of coasting can increase or be indicative of fuel/energy efficient driving.

Similar to the previous bucket examples, the following bucket examples can characterize the state of a vehicle over a period of time at respective timestamps of the vehicle. Yet another example category of buckets is an accelerator pedal engagement category. Example buckets for accelerator pedal engagement can include a first bucket for accelerator pedal engagement over approximately 95 percent, and a second bucket for accelerator pedal engagement less than or equal to approximately 95 percent. Yet another example category of buckets is for idling. Example buckets for idling can include a first bucket for idling true, and a second bucket for idling false. Yet another example category of buckets is for anticipation. Example buckets for idling can include a first bucket for any brake event, and a second bucket for a quick brake event. Similar to previous metrics, reduced use of accelerator pedal engagement above 95% and/or reduced idling can increase or be indicative of fuel/energy efficient driving.

Another example bucket is a bucket for a particular vehicle battery charge. For example, in the context of an electric vehicle or a plug-in hybrid electric vehicle, the vehicle gateway device 150 can determine that vehicle battery data is associated with a particular instance of a vehicle battery charge.

At block 412, the vehicle metric data can be aggregated. In particular, the vehicle gateway device 150 can aggregate, over the period of time, the vehicle metrics into the corresponding vehicle metric buckets to generate aggregated bucketed vehicle metric data. In various implementations, the period of time of aggregation can be a fixed period (e.g., 5 minutes) or it may be variable or vary based on various factors. Such factor may include, for example, network availability, amount of data received, time since last update, and/or the like. In various implementations, the period of time may vary based on the metric and/or other factors, and/or may be user configurable. The vehicle gateway device 150 can represent the aggregations differently based on the embodiment or in multiple ways. For example, the vehicle gateway device 150 can aggregate a cumulative time spent in each bucket. In the case of RPM buckets, the vehicle gateway device 150 can aggregate a cumulative time spent in each bucket (e.g., 1 minute and 10 seconds in the "green" bucket and 2 minutes and 15 seconds in the "red" bucket). Additional example aggregations can include: time spent with cruise control on and time spent with cruise control off; time spent coasting as true and time spent coasting as false; time spent with the accelerator pedal engagement over approximately 95 percent and time spent with the accelerator pedal engagement less than or equal to approximately 95 percent; and/or time spent idling as true and time spent idling as false. Additionally or alternatively, the vehicle gateway device 150 can represent the time spent in each bucket as a percentage. In some embodiments, the vehicle gateway device 150 can store the bucketed vehicle metric data and/or the aggregated bucketed vehicle metric data in the computer-readable stored medium(s) 330 of the vehicle gateway device 150.

In some embodiments, the vehicle gateway device 150 can aggregate, over the period of time, quantities. For example, if each bucket has discrete items (such as events), the vehicle gateway device 150 can aggregate the discrete items in each bucket. In the case of anticipation buckets, the vehicle gateway device 150 can aggregate the total number of any type of brake event in a first bucket and the total number of quick brake events in the second bucket. For example, the vehicle gateway device 150 can aggregate the first bucket to have a total of 15 of any type of brake events and the second bucket to have a total of 5 of quick brake events. Additionally or alternatively, the vehicle gateway device 150 can represent each aggregated bucket total as a percentage.

In some embodiments, the vehicle gateway device 150 can aggregate bucket(s) for a vehicle battery charge by determining charge record(s) from the vehicle battery data. An example charge record can include (i) data indicative of an amount of energy charged relative to a capacity of the battery (such as a percentage of the battery charged for a particular charge instance) and (ii) an amount of energy charged relative to a period of time (such as a charge amount in a unit of energy like kilowatt-hour (kWh)). Another example charge record can include (i) a start state of charge, (ii) an end state of charge, and (iii) an amount of energy charged. As described herein, the vehicle gateway device 150 can transmit historical vehicle battery data to the management server 140 and the management server 140 can determine charge record(s) from the historical vehicle battery data. Depending on the embodiment, the historical vehicle battery data can include charge record(s) or the historical vehicle battery data can include the underlying data with which the management server 140 can calculate the charge record(s).

At block 414, it can be determined whether the aggregation time threshold has been met. In particular, the vehicle gateway device 150 can determine whether the aggregation time threshold has been met. Example aggregation time thresholds can include 1 minute, 2 minutes, 5 minutes, etc. The vehicle gateway device 150 can maintain a running timer to determine whether the aggregation time threshold has been met. Additionally or alternatively, the vehicle gateway device 150 can maintain a last expiration time variable and can determine a difference between the last expiration time with a current time. When the difference between the last expiration time and the current time is greater than or equal to the aggregation time threshold, the vehicle gateway device 150 can determine that the aggregation time threshold has been met. If it has been determined that the aggregation time threshold has been met, the method can proceed to block 418 for transmitting the aggregated data. Otherwise, the method can return to block 402 to receive more vehicle data and operate in a loop until the aggregation time threshold has been met.

In some embodiments, there can be different time thresholds for different vehicle metrics. For example, metrics regarding RPM and fuel level can be provided to the management server 140 more regularly, such as every five minutes. As another example, the vehicle battery data and/or the battery charge record(s) can be provided once or twice a day from the vehicle gateway device 150 to the management server 140.

In some embodiments (while not illustrated), while the block 412 for aggregating bucketed vehicle metric data appears before the block 414 for determining whether the aggregation time threshold has been met, the reverse can occur. Specifically, the block 412 for aggregating bucketed vehicle metric data can occur after the block 414 that determines whether the aggregation time threshold has been met. For example, if the aggregation time threshold has been met (such as five minutes), the vehicle gateway device 150 can then aggregate the bucketed data and then proceed to block 418 for transmitting the aggregated data.

At block 418, the aggregated bucketed vehicle metric data can be transmitted. In particular, in response to determining that an aggregation time threshold is met, the vehicle gateway device 150 can transmit, to a receiving server system (such as the management server 140), the aggregated bucketed vehicle metric data. For example, the vehicle gateway device 150 can transmit any of the aggregated bucketed data relating to cruise control use, coasting, accelerator pedal use, idling, battery state, anticipation, motor rotations per minute, motor power, fuel level, engine revolutions per minute (RPM), speed, engine torque, engine load, brake use, etc. In particular, the vehicle gateway device 150 can transmit charge records to a computing device such as the management server 140. In some embodiments, if the vehicle gateway device 150 loses network connection, the vehicle gateway device 150 can queue aggregated vehicle data until it obtains the network connection again. As shown, after the data has been transmitted, the method can return to block 402 to receive more data and perform in a loop until the aggregation time threshold is met again.

Accordingly, the vehicle gateway device 150 can advantageously transmit vehicle data in an efficient manner. Example advantages (not all of which may be applicable in every embodiment) can include the following. For example, instead of the vehicle gateway device 150 transmitting vehicle data with a higher frequency (such as every millisecond), the vehicle gateway device 150 can transmit the vehicle data with a lower frequency. This can result in lower bandwidth usage. As another example, instead of transmitting vehicle individual data items (such as cruise control use, RPM, speed, engine torque, engine load, brake use, etc. for every millisecond), the vehicle gateway device 150 transmits aggregated vehicle data. Accordingly, the aggregated vehicle data can have a smaller data size than the total data size of the individual data items. In other words, the aggregated vehicle data can be a compressed, summary data representation of the raw vehicle data. This can be advantageous because the compressed vehicle data can use less network bandwidth and/or can be transmitted to the destination server faster in contrast to the individual data items that would use more network bandwidth and/or would be transmitted slower.

Turning to FIG. 4B, beginning at block 432, vehicle location data can be determined. In particular, the vehicle gateway device 150 can determine the vehicle location data. For example, the vehicle gateway device 150 can receive location data from the location device(s), such as GPS or GLONASS receivers. The location data can be associated with timestamps. Accordingly, the vehicle gateway device 150 can determine geolocation data associated with the vehicle 110, which can include time data.

At block 434, data from the additional device(s) can be determined. In particular, the vehicle gateway device 150 can receive data from the additional device(s). For example, the vehicle gateway device 150 can receive camera data and/or sensors data. Similar to the vehicle location data that can be associated with timestamps, the additional devices data can be associated with timestamps. At block 436, the vehicle location data and/or the additional devices data can be stored. In particular, the vehicle gateway device 150 can store the vehicle location data and/or the additional devices data in the computer-readable stored medium(s) 330 of the vehicle gateway device 150.

At block 438, data can be aggregated and/or bucketed. In particular, the vehicle gateway device 150 can aggregate the vehicle location data and/or the additional devices data. For example, as opposed to a time series that includes pairs of time values and data values for relatively small units of time, the vehicle gateway device 150 can aggregate at least one of the vehicle location data or the additional devices data to represent that a respective data value is associated with a period time. Additionally or alternatively, the vehicle location data and/or the additional devices data can be bucketed. Block 438 for aggregating/bucketing data can be similar to blocks 410, 412 of FIG. 4A for aggregating/bucketing data. For example, similar to the bucketed vehicle metric data that was aggregated by the vehicle gateway device 150 described above with respect to FIG. 4A, the vehicle location data and/or the additional devices data can be bucketed/aggregated by the vehicle gateway device 150. For example, in the case of vehicle location data, particular locations or location areas can each have respective buckets and the vehicle gateway device 150 can determine how much time the vehicle 110 spent at each location or location area over a period of time, i.e., a cumulative time for each location bucket. For example, in the case of additional sensor data, ranges of the sensor data can each have respective buckets and the vehicle gateway device 150 can determine how much time the sensor spent within the respective sensor ranges over a period of time, i.e., a cumulative time for each sensor range bucket.

At block 440, it can be determined whether the aggregation time threshold has been met. In particular, the vehicle gateway device 150 can determine whether the aggregation time threshold has been met. Block 440 for determining whether the aggregation time threshold has been met can be similar to block 414 of FIG. 4A for determining whether the aggregation time threshold has been met. For example, the aggregation time threshold can be the same for the aggregated vehicle data, the vehicle location data, and/or the additional devices data. Also, in some embodiments, while not illustrated, the block 438 for aggregating/bucketing data can be performed after it has been determined that the aggregation time threshold has been met. If the aggregation time threshold has been met, the method can proceed to block 444. Otherwise, the method can return to block 432 to receive more vehicle location data and/or additional devices data and perform in a loop until the aggregation time threshold has been met. At blocks 444, 446, the vehicle location data and/or the additional devices data can be transmitted to a receiving server system. In particular, the vehicle gateway device 150 can transmit the vehicle location data and/or the additional devices data (which can be aggregated/bucketed) to the management server 140. As shown, after the data has been transmitted, the method can return to block 432 to receive more data and perform in a loop until the aggregation time threshold is met again.

Figure 5A:
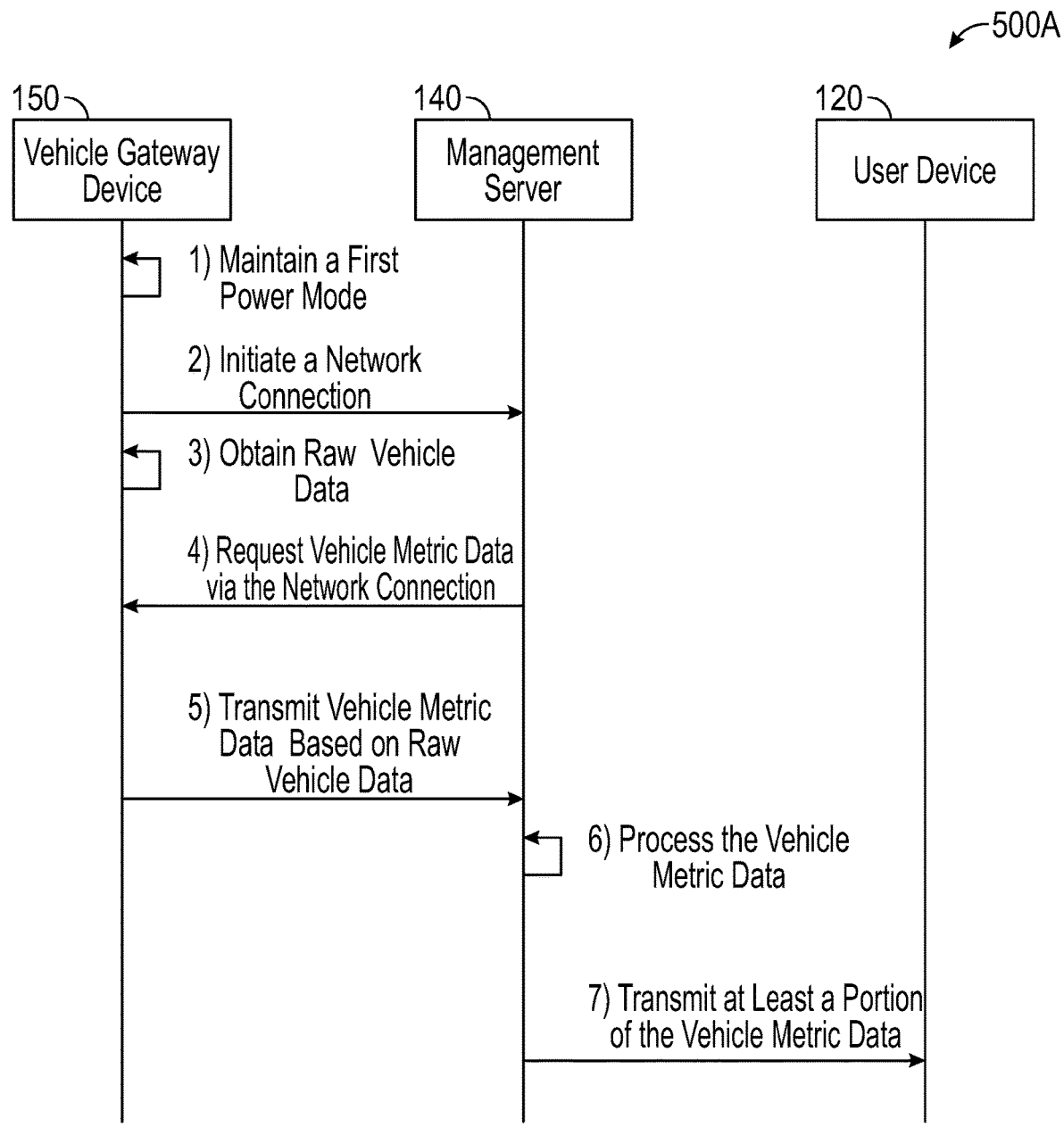
FIGS. 5A-5B depict example workflows for a vehicle gateway device in a standby power mode receiving data requests, according to various embodiments of the present disclosure.

VII. Example Methods and Functionality for Initiating and Maintaining a Network Connection in a Standby Power Mode As noted above, a management server may request vehicle metric data from the vehicle gateway device in order to identify particular metrics associated with a vehicle and/or a fleet of vehicles. The vehicle gateway device can initiate a network connection with the management server in order to receive requests for vehicle metric data from the management server. With reference to FIG. 5A, illustrative interactions 500A for initiating a network connection between a vehicle gateway device and a management server in order to receive requests for vehicle metric data will now be described. Specifically, the illustrative interactions of FIG. 5A depict how the vehicle gateway device 150 can initiate a network connection with a management server 140 in order to respond to requests for vehicle metric data.

At (1), as described above, the vehicle gateway device 150 maintains a first power mode. The first power mode may be a full power mode, a moderate power mode, an increased power mode, etc. The first power mode may correspond to a "powered-on" status of the vehicle gateway device 150. The first power mode may correspond to a first set of active peripherals or components (e.g., one or more of processing units, accelerometers, servers, network managers, etc.) and/or activities of the vehicle gateway device (e.g., garbage collection, monitoring, log pushes, NTP requests, a keep alive interval, etc.). Further, during operation of the vehicle gateway device 150 at the first power mode, the vehicle gateway device 150 can consume a first amount of power.

At (2), the vehicle gateway device 150 initiates a network connection between the vehicle gateway device 150 and the management server 140. The network connection may include a Transmission Control Protocol ("TCP") connection between the vehicle gateway device 150 and the management server 140. Further, the network connection may be a connection over an LTE network. Based on initiating the network connection between the vehicle gateway device 150 and the management server 140, the network connection may be opened. The vehicle gateway device 150 and/or the management server 140 may send and receive packets via the opened network connection (e.g., data, data requests, etc.). The network connection may be established prior to packets being transmitted between the vehicle gateway device 150 and the management server 140. The vehicle gateway device 150 and/or the management server 140 may send and receive packets via the opened network connection while the network connection is maintained in an opened state. For example, the network connection may close based on a certain time period of inactivity, a connection termination request, etc. Upon the closing of the network connection, in order to send and receive packets, the vehicle gateway device 150 may initiate a new network connection between the vehicle gateway device 150 and the management server 140.

At (3), the vehicle gateway device 150 obtains raw vehicle data. The raw vehicle data can be received over a period of time. Raw vehicle data can include any data corresponding to a vehicle. For example, raw vehicle data can include any vehicle diagnostic data, such as, but not limited to, data related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle.

At (4), the management server 140 requests vehicle metric data from the vehicle gateway device 150 via the network connection. The management server 140 can request particular vehicle metric data associated with particular criteria (e.g., vehicle metric data associated with a particular time period, a particular vehicle, a particular component or peripheral, a particular vehicle activity, etc.) In some embodiments, the management server 140 can request historic (e.g., previously stored) vehicle metric data associated with the vehicle. For example, the management server 140 can request vehicle metric data stored by the vehicle gateway device and corresponding to a previous time period. In other embodiments, the management server 140 can request substantially real-time vehicle metric data associated with the vehicle. For example, the management server 140 can request vehicle metric data as the vehicle metric data is identified and stored by the vehicle gateway device 150.

At (5), the vehicle gateway device 150 transmits vehicle metric data based on the raw vehicle data to the management server 140 via the network connection. The vehicle gateway device 150 can receive the request for vehicle metric data from the management server and, in response to receiving the request, identify a particular set of vehicle metric data. For example, the vehicle gateway device 150 can identify vehicle metric data that satisfies the criteria from the request for vehicle metric data. The vehicle metric data can include aggregated and/or bucketed data. Based on identifying the vehicle metric data, the vehicle gateway device 150 can transmit the vehicle metric data to the management server 140.

At (6), the management server 140 processes the vehicle metric data. The management server 140 can process the vehicle metric data in order to identify vehicle metric data associated with a particular vehicle, a particular driver, a particular vehicle gateway device, a particular time range, a particular component or peripheral of the vehicle, a particular vehicle characteristics, a particular fleet, a particular cohort, or any other characteristic. Further, the management server 140 can process the vehicle metric data in order to identify data associated with fuel/energy efficiencies, correlations among vehicle metrics and fuel/energy efficiency, a fuel/energy efficiency score, safety measurements, correlations among vehicle metrics and safety measurements, and/or a safety score.

At (7), the vehicle gateway device 150 transmits at least a portion of the vehicle metric data to the user device 120. The user device 120 can obtain the at least a portion of the vehicle metric data via an application. For example, the user device 120 may execute an application (e.g., a browser, a stand-alone application, etc.) that identifies the vehicle metric data and allows a user to access interactive user interfaces, view analyses or aggregated data, and/or the like as described herein.

Figure 5B:
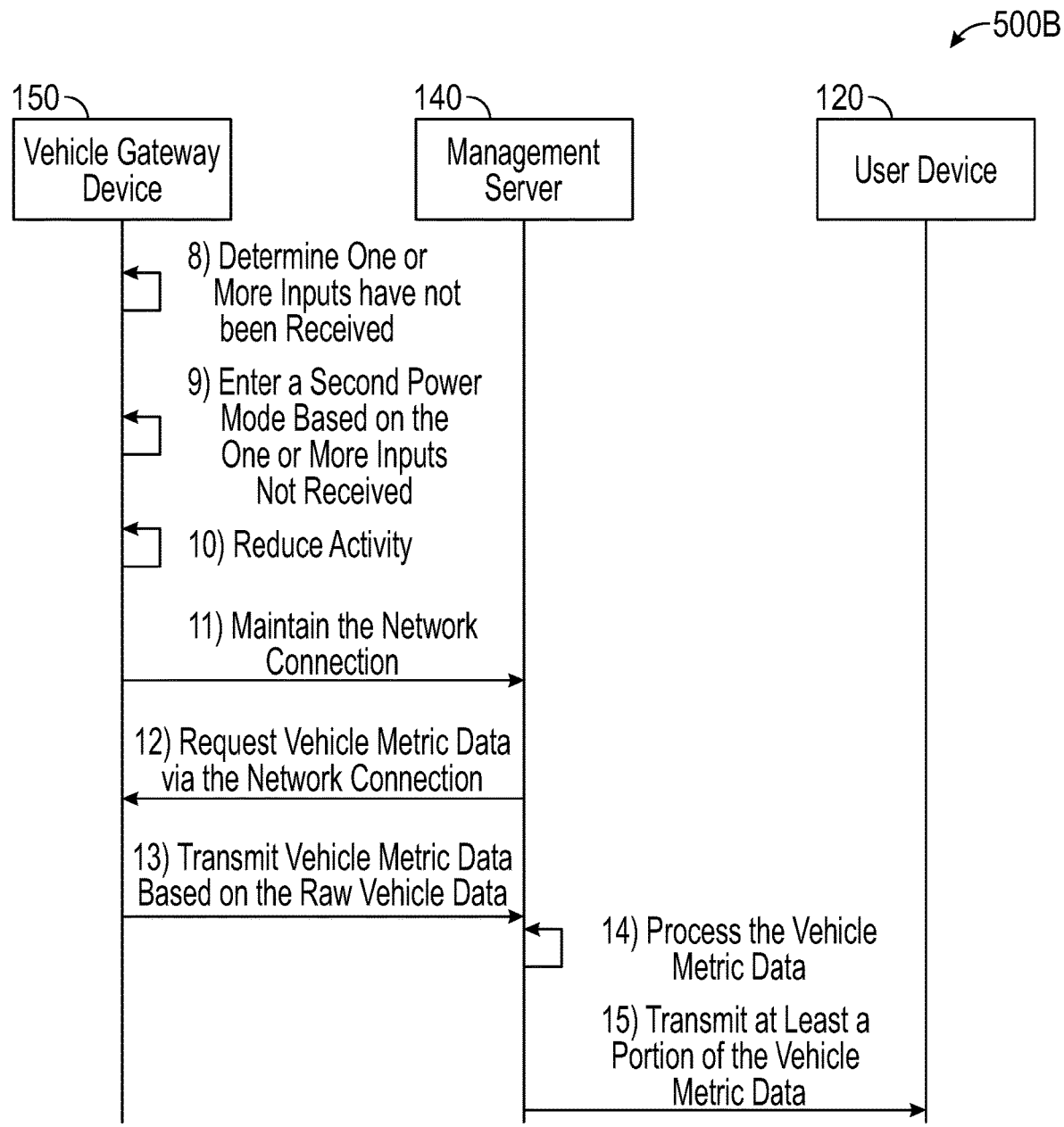

As noted above, a vehicle gateway device may initiate a network connection with a management server in order to provide vehicle metric data while in a first power mode. The vehicle gateway device can maintain the network connection while in a standby power mode in order to respond to requests for vehicle metric data in a timely and efficient manner. With reference to FIG. 5B, illustrative interactions 500B for maintaining a network connection between a vehicle gateway device and a management server in order to receive requests for vehicle metric data while the vehicle gateway device is in a standby power mode will now be described. Specifically, the illustrative interactions of FIG. 5B depict how the vehicle gateway device 150, at a standby power mode, can maintain a network connection with a management server 140 in order to respond to requests for vehicle metric data.

At (8), as described above, the vehicle gateway device 150 determines that one or more inputs have not been received. The vehicle gateway device 150, at the first power mode, may determine that one or more expected inputs have not been received. For example, the vehicle gateway device 150 may determine that one or more inputs from a peripheral or a component have not been received (e.g., inputs from an accelerometer, a vehicle battery, a vehicle computer. etc.). The vehicle gateway device 150 may determine that the one or more inputs have not been received over a particular time period. For example, the vehicle gateway device 150 may determine that an input from the accelerometer has not been received over a 48 hour time period. It will be understood that the time period may correspond to any period of time. By determining that the one or more inputs have not been received over a particular time period, the vehicle gateway device 150 may determine that the vehicle is not being operated and/or being moved. For example, the vehicle gateway device 150 may identify an activity status (either active or inactive) for the vehicle gateway device 150 based on the determination that a signal has not been received from one or more of the peripherals or components.

At (9), the vehicle gateway device 150 enters a second power mode based on determining that one or more inputs have not been received. The second power mode may be a standby power mode, a low power mode, a reduced power mode, etc. The second power mode may correspond to a "standby" status of the vehicle gateway device 150. Further, during operation of the vehicle gateway device 150 at the second power mode, the vehicle gateway device 150 can consume a second amount of power. The second amount of power may be less than the first amount of power.

At (10), the vehicle gateway device 150 reduces activity of the vehicle gateway device 150. For example, the vehicle gateway device 150 may reduce the number of active peripherals or components and/or the activities being performed. The second power mode may correspond to a second set of active peripherals or components (e.g., one or more of processing units, accelerometers, servers, network managers, etc.) and/or activities of the vehicle gateway device 150 (e.g., garbage collection, monitoring, log pushes, NTP requests, a keep alive interval, etc.). For example, the second set of active peripherals or components and/or activities of the vehicle gateway device 150 may be a subset of the first set of active peripherals or components and/or activities of the vehicle gateway device 150. Reducing the activity of the vehicle gateway device 150 can include one or more of reducing a sampling rate of an accelerometer, deactivating a server of the vehicle gateway device 150, blocking log pushes, eliminating NTP requests, reducing computing operations of the vehicle gateway device 150, or any other reduction in activity of the vehicle gateway device 150.

At (11), the vehicle gateway device 150 maintains the network connection with the management server 140. The vehicle gateway device 150 may maintain the network connection using keep alive messages. For example, one or more keep alive messages may be sent between the vehicle gateway device 150 and the management server 140 in order to maintain the network connection between the vehicle gateway device 150 and the management server 140. In some embodiments, the one or more keep alive messages may be based at least in part on a keep alive interval. By maintaining the network connection, the vehicle gateway device 150 may maintain the open status of the network connection.

At (12), the management server 140 requests vehicle metric data from the vehicle gateway device 150 via the network connection. The management server 140 can request particular vehicle metric data associated with particular criteria (e.g., vehicle metric data associated with a particular time period, a particular vehicle, a particular component or peripheral, a particular vehicle activity, etc.) The management server 140 can request historic (e.g., previously stored) vehicle metric data associated with the vehicle. For example, the management server 140 can request vehicle metric data stored by the vehicle gateway device and corresponding to a previous time period. Further, the management server 140 can request vehicle metric data stored by the vehicle gateway device at a first power mode.

At (13), the vehicle gateway device 150 transmits vehicle metric data based on the raw vehicle data to the management server 140 via the network connection. In response to receiving the request for vehicle metric data from the management server 140, the vehicle gateway device 150 can enter the first power mode in order to transmit the vehicle metric data to the management server 140. Further, the vehicle gateway device 150 can receive the request for vehicle metric data from the management server and, in response to receiving the request, identify a particular set of vehicle metric data. For example, the vehicle gateway device 150 can identify vehicle metric data that satisfies the criteria from the request for vehicle metric data. The vehicle metric data can include aggregated and/or bucketed data. Based on identifying the vehicle metric data, the vehicle gateway device 150 can transmit the vehicle metric data to the management server 140.

At (14), the management server 140 processes the vehicle metric data. The management server 140 can process the vehicle metric data in order to identify vehicle metric data associated with a particular vehicle, a particular driver, a particular vehicle gateway device, a particular time range, a particular component or peripheral of the vehicle, a particular vehicle characteristics, a particular fleet, a particular cohort, or any other characteristic. Further, the management server 140 can process the vehicle metric data in order to identify data associated with fuel/energy efficiencies, correlations among vehicle metrics and fuel/energy efficiency, a fuel/energy efficiency score, safety measurements, correlations among vehicle metrics and safety measurements, and/or a safety score.

At (15), the vehicle gateway device 150 transmits at least a portion of the vehicle metric data to the user device 120. The user device 120 can obtain the at least a portion of the vehicle metric data via an application. For example, the user device 120 may execute an application (e.g., a browser, a stand-alone application, etc.) that identifies the vehicle metric data and allows a user to access interactive user interfaces, view analyses or aggregated data, and/or the like as described herein.

Figure 6A:
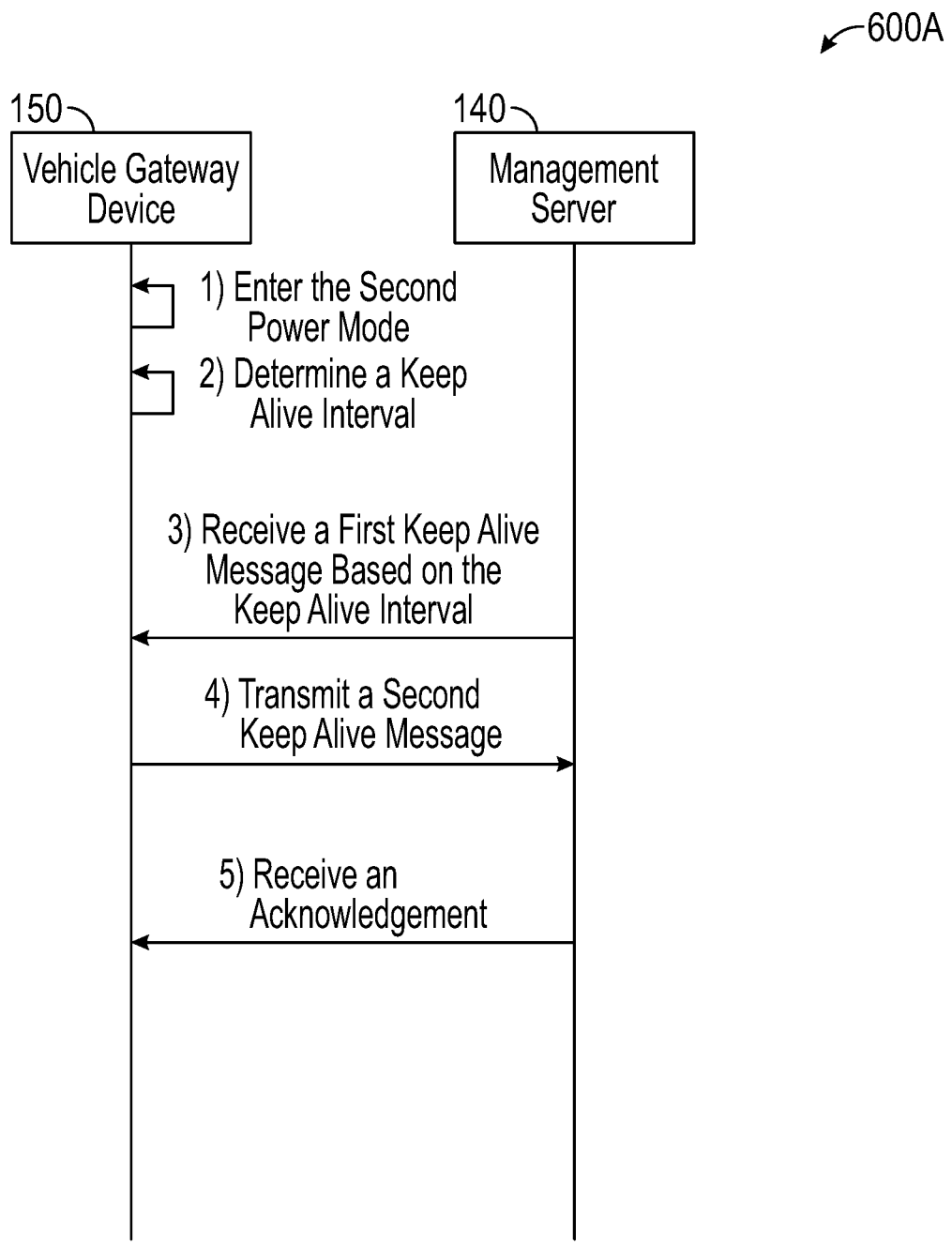
FIGS. 6A-6B depict example workflows for vehicle gateway device in a standby power mode maintaining a network connection with a management server, according to various embodiments of the present disclosure.

VIII. Example Methods and Functionality for
Maintaining a Network Connection Using a
Keep-Alive Message As noted above, a vehicle gateway device, at a second power mode, may maintain a network connection between the vehicle gateway device using a plurality of keep alive messages. The vehicle gateway device can transmit the plurality of keep alive messages between the vehicle gateway device and the management server in order to keep the network connection maintained (e.g., opened). With reference to FIG. 6A, illustrative interactions 600A maintain a network connection between a vehicle gateway device and a management server in order to receive requests for vehicle metric data will now be described. Specifically, the illustrative interactions of FIG. 6A depict how the vehicle gateway device 150 can maintain a network connection with a management server 140 in order to respond to requests for vehicle metric data.

At (1), as described above, the vehicle gateway device 150 enters a second power mode (e.g., a standby power mode). In order to enter the second power mode, the activity of the vehicle gateway device 150 and/or the number of active peripherals or components of the vehicle gateway device 150 may be reduced. For example, while the vehicle gateway device 150 may conduct log pushes at a first power interval, the vehicle gateway device 150 may block log pushes at a second power interval in order to reduce the amount of power that is being consumed due to operation of the vehicle gateway device. It will be understood that more, less, or different activities of the vehicle gateway device 150, active peripherals, and/or components can be reduced. In some embodiments, the second power mode may correspond to a sleep state of the vehicle gateway device 150.

At (2), the vehicle gateway device 150 determines a keep alive interval. The keep alive interval may identify a time period between the transmission of keep alive messages (e.g., packets, requests, etc.). For example, the vehicle gateway device 150 may send a first keep alive message, wait a time period based on the keep alive interval, and send a second keep alive message. Every keep alive interval, the vehicle gateway device 150 may send a keep alive message to the management server 140. In response, the management server 140 may provide a responsive keep alive message. The vehicle gateway device 150, at a first power mode, may have a first keep alive interval and, at a second power mode, may have a second keep alive interval. In some embodiments, the second keep alive interval may be the same as the first keep alive interval. For example, the first keep alive interval and the second keep alive interval may be 120 seconds. In other embodiments, the second keep alive interval may be longer than the first keep alive interval. For example, the first keep alive interval may be 30 seconds and the second keep alive interval may be 120 seconds.

In order to maintain the network connection when the vehicle gateway device 150 is at a second power mode, the vehicle gateway device 150 may increase the keep alive interval. For example, the keep alive interval for one or more power modes (e.g., all power modes) may be changed to an extended keep alive interval (e.g., 120 seconds). In order to increase the keep alive interval, the vehicle gateway device 150 can transmit a request to the management server 140 to increase the keep alive interval. By increasing the keep alive interval, the amount of power consumed by the vehicle gateway device 150 may be maintained at a second power level associated with the second power mode.

At (3), the vehicle gateway device 150 receives a first keep alive message based on the keep alive interval from the management server 140. The first keep alive message may be a data packet with a plurality of packet layers. For example, the data packet may include an Application Layer, a Transport Layer, a Network Layer, etc. The management server 140 may transmit the first keep alive message to the vehicle gateway device 150 to indicate to the vehicle gateway device 150 that the management server 140 is still active (alive). Based on receiving the first keep alive message from the management server 140, the vehicle gateway device 150 may determine that the management server 140 is active and the network connection should be maintained. In some embodiments, the vehicle gateway device 150 may transmit the first keep alive message to the management server 140.

In response to receiving the first keep alive message from the management server 140, at (4), the vehicle gateway device 150 transmits a second keep alive message to the management server 140. The vehicle gateway device 150 may transmit the second keep alive message to the management server 140 in response to receiving the first keep alive message. Similar to the first keep alive message, the second keep alive message may be a data packet with a plurality of packet layers. The vehicle gateway device 150 may transmit the second keep alive message to the management server 140 to indicate to the management server 140 that the vehicle gateway device 150 is still active. In response to receiving the second keep alive message from the vehicle gateway device 150, the management server 140 may not terminate the network connection between the vehicle gateway device 150 and the management server 140.

At (5), the vehicle gateway device 150 receives an acknowledgement from the management server 140. The vehicle gateway device 150 may receive the acknowledgement from the management server 140 in order to acknowledge receipt of the second keep alive message by the management server 140. In response to receiving the acknowledgment from the management server 140, the vehicle gateway device 150 may not terminate the network connection between the vehicle gateway device 150 and the management server 140.

Figure 6B:
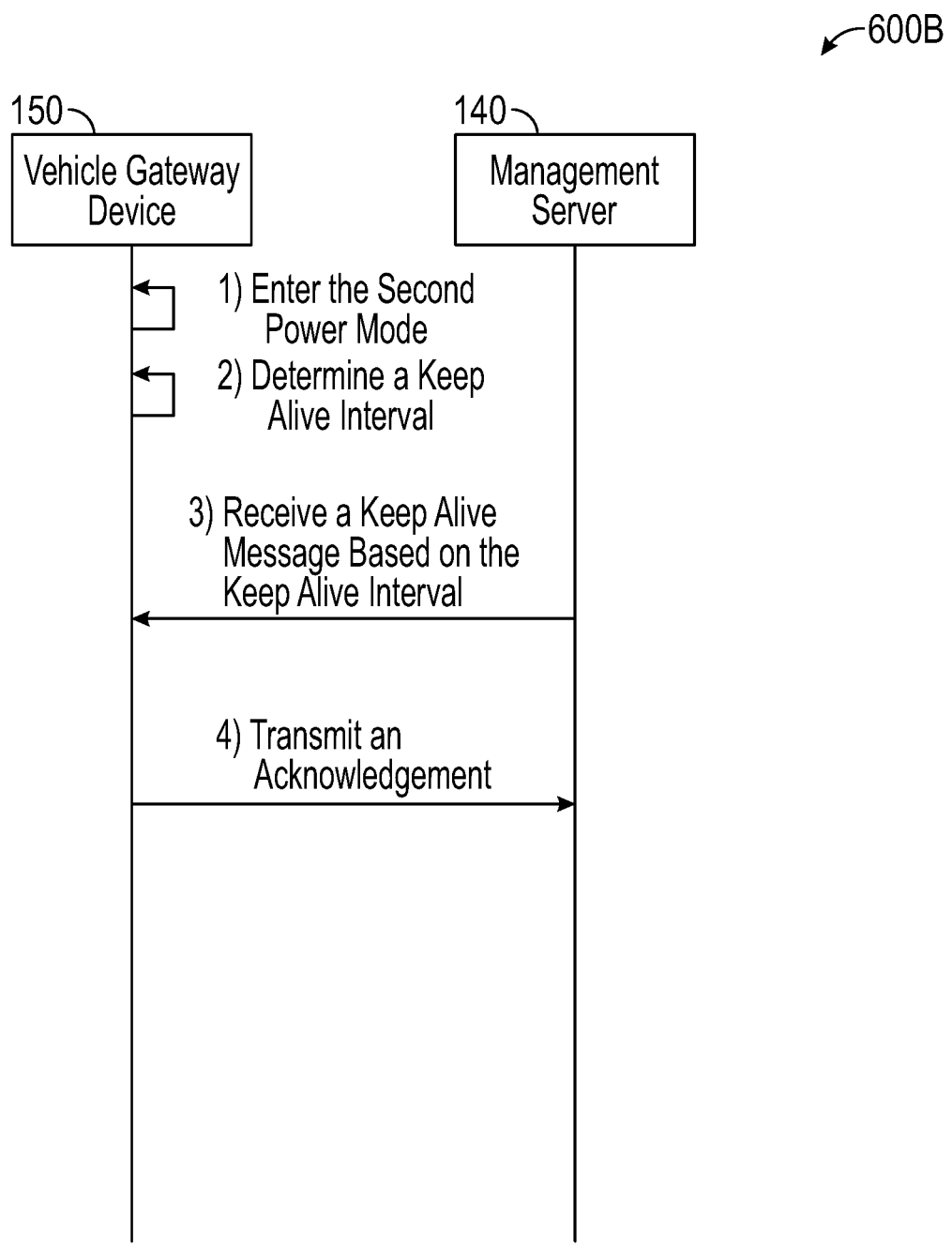

As noted above, a vehicle gateway device 150, at a second power mode, may maintain a network connection between the vehicle gateway device 150 and the management server 140 using a keep alive message. The vehicle gateway device 150 can transmit a keep alive message between the vehicle gateway device 150 and the management server 140 in order to keep the network connection maintained (e.g., opened). With reference to FIG. 6B, illustrative interactions 600B maintain a network connection between a vehicle gateway device 150 and a management server 140 in order to receive requests for vehicle metric data will now be described. Specifically, the illustrative interactions of FIG. 6B depict how the vehicle gateway device 150 can maintain a network connection with a management server 140 in order to respond to requests for vehicle metric data. Similar to FIG. 6A, the illustrative interactions of FIG. 6B identify a method of maintaining a network connection using keep alive messages. While FIG. 6A is directed to the transmission of multiple keep alive messages between the vehicle gateway device 150 and the management server 140 to maintain a network connection, FIG. 6B is directed to the transmission of a singular keep alive message between the vehicle gateway device 150 and the management server 140 to maintain the network connection.

At (1), as described above, the vehicle gateway device 150 enters a second power mode (e.g., a standby power mode). In order to enter the second power mode, the activity of the vehicle gateway device 150 and/or the number of active peripherals or components of the vehicle gateway device 150 may be reduced.

At (2), the vehicle gateway device 150 determines a keep alive interval. Every keep alive interval, the vehicle gateway device 150 may send a keep alive message to the management server 140. In response, the management server 140 may provide an acknowledgement.

At (3), the vehicle gateway device 150 receives a keep alive message based on the keep alive interval from the management server 140. The management server 140 may transmit the keep alive message to the vehicle gateway device 150 to indicate to the vehicle gateway device 150 that the management server 140 is still active (alive). Based on receiving the first keep alive message from the management server 140, the vehicle gateway device 150 may determine that the management server 140 is active and the network connection should be maintained. In response to receiving the keep alive message from the management server 140, the vehicle gateway device 150 may not terminate the network connection between the vehicle gateway device 150 and the management server 140.

At (4), the vehicle gateway device 150 transmits an acknowledgement to the management server 140. The vehicle gateway device 150 may transmit the acknowledgement to the management server 140 in order to acknowledge receipt of the keep alive message by the vehicle gateway device 150. Based on receiving the acknowledgement, the management server 140 may determine that the network connection is active (e.g., is actively being used) and maintains the network connection. For example, the management server 140 may not terminate the network connection based on receiving the acknowledgment. It will be understood that more, less, or different combinations of keep alive messages may be sent between the vehicle gateway device 150 and the management server 140.

Figure 7:
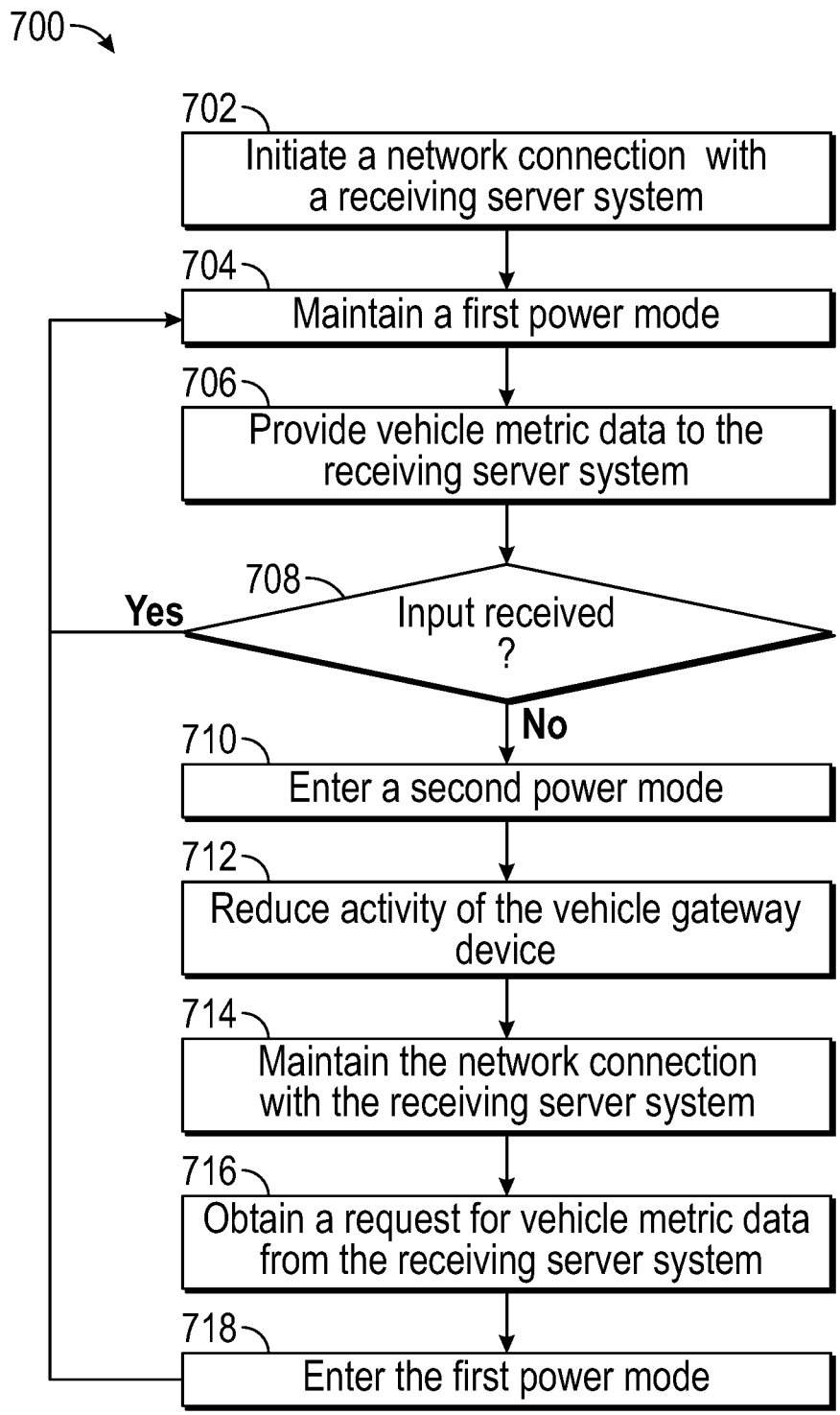
FIG. 7 is a flowchart illustrating example methods and functionality for maintaining a network connection while in a standby power mode, according to various embodiments of the present disclosure.

IX. Example Methods and Functionality for Responding to Data Requests while in a Standby Power Mode As noted above, a vehicle gateway device at a standby power mode may maintain a network connection with a receiving server system (e.g., a management server) in order to respond to data requests from the receiving server system in a timely and efficient manner. The network connection may be used by the vehicle gateway device to communicate with the receiving server system and to transmit requested vehicle metric data. FIG. 7 is a flowchart of an example routine for maintaining a network connection while in a second power mode (e.g., a standby power mode. The routine 700 may be carried out by the vehicle gateway device of FIG. 1.

The routine begins at block 702, a vehicle gateway device initiates a network connection with a receiving server system. The network connection may be an LTE network connection.

At block 704, the vehicle gateway device maintains a first power mode. Power consumption of the vehicle gateway device at the first power mode may correspond to a first power level. The vehicle gateway device may maintain a first set of activities, a first set of active peripherals/components, etc. while at the first power mode. The first power mode may correspond to a full power mode or a moderate power mode.

At block 706, the vehicle gateway device provides vehicle metric data to the receiving server system. In some embodiments, the vehicle gateway device may provide the vehicle metric data in response to a request for vehicle metric data. In other embodiments, the vehicle gateway device may not provide the vehicle metric data in response to a request for vehicle metric data and may provide the vehicle metric data periodically or aperiodically.

At block 708, the vehicle gateway device determines if input has been received. The input may include may include input from one or more of an accelerometer, a vehicle battery, a vehicle computer, or any other component associated with the vehicle gateway device. The vehicle gateway device may determine if input has been received from a particular component within a particular time period. In response to determining that the input has been received, the routine 700 may repeat at block 704 and the vehicle gateway device may maintain the first power mode.

In response to determining that the input has not been received, at block 710, the vehicle gateway device enters a second power mode. The second power mode may be a standby power mode. Power consumption of the vehicle gateway device at the second power mode may correspond to a second power level. The second power level may be less than the first power level.

At block 712, the vehicle gateway device reduces activity of the vehicle gateway device. In some embodiments, prior to reducing activity of the vehicle gateway device, the vehicle gateway device may confirm that the network connection between the vehicle gateway device and the receiving server system is an LTE network connection. Further, the vehicle gateway device may indicate to the receiving server system that the network connection is an LTE network connection. The vehicle gateway device may reduce activity of the vehicle gateway device in response to entering the second power mode. In order to reduce the activity of the vehicle gateway device, the vehicle gateway device may adjust one or more parameters. For example, the vehicle gateway device may perform one or more of the following operations: reduce the sampling rate of the accelerometer, deactivate WiFi capabilities of the vehicle gateway device, deactivate a server of the vehicle gateway device, block log pushes, eliminate NTP requests, reduce computing operations of the vehicle gateway device, reduce polling of one or more systems or components, or any other operations that reduce the power consumption of the vehicle gateway device. Further, the vehicle gateway device at the second power mode may sample the accelerometer at a second rate and the vehicle gateway device at the first power mode may sample the accelerometer at a first rate that is greater than the second rate.

At block 714, the vehicle gateway device maintains the network connection with the receiving server system. By reducing the activity of the vehicle gateway device, the vehicle gateway device may keep the power consumption of the vehicle gateway device substantially at the second power level associated with the second power mode while maintaining the network connection with the receiving server system. The vehicle gateway device may maintain the network connection by transmitting a keep alive message between the vehicle gateway device and the receiving server system. In some embodiments, in order to maintain the network connection, the vehicle gateway device may transmit a first keep alive message to the receiving server system, receive a second keep alive message from the receiving server system in response to the first keep alive message, and transmit an acknowledgement to the receiving server system. In other embodiments, in order to maintain the network connection, the vehicle gateway device may transmit a keep alive message to the receiving server system and, in response to the keep alive message, the vehicle gateway device may receive an acknowledgement from the receiving server system. The vehicle gateway device may transmit the keep alive message between the vehicle gateway device and the receiving server system based at least in part on a keep alive interval. For example, the keep alive interval may be approximately 120 seconds. The vehicle gateway device at the first power mode may transmit a first keep alive message to the receiving server system at a first keep alive interval and, at the second power mode, may transmit a second keep alive message to the receiving server system at a second keep alive interval. The second keep alive interval may be a greater interval of time than the first keep alive interval. The keep alive message and/or the keep alive interval may be based at least in part on a TCP timeout. The keep alive interval may be based on multiple TCP timeouts. For example, the keep alive interval may be based on a first TCP timeout associated with a first cellular provider and a second TCP timeout associated with a second cellular provider. Further, where the TCP timeout is 5 minutes, the keep alive interval may be 120 seconds such that at least one keep alive message may be dropped and/or missed.

At block 716, the vehicle gateway device obtains a request for vehicle metric data from the receiving server system. The vehicle gateway device may obtain a message that includes the request for vehicle metric data. The request for vehicle metric data may include a request for a particular set of image data (e.g., video data). The request for vehicle metric data may include historical vehicle metric data and/or substantially real-time vehicle metric data. For example, the request for vehicle metric data may include a request to activate a camera associated with the vehicle gateway device and transmit image data received by the camera. In some embodiments, the request for vehicle metric data can include a request for log data, a request to implement debugging commands, etc.

At block 718, the vehicle gateway device enters the first power mode. The vehicle gateway device may enter the first power mode in response to obtaining the request for vehicle metric data from the receiving server system. Further, in response to obtaining the request for vehicle metric data, the vehicle gateway device may transmit a response to the request for the vehicle metric data (e.g., the requested vehicle metric data) to the receiving server system. The requested vehicle metric data may include and/or be associated with one or more of the following parameters or measurements: cruise control, coasting, accelerator pedal, idling, anticipation, engine rotations per minute, motor rotations per minute, or motor power. The routine 700 may repeat at block 704 and the vehicle gateway device may maintain the first power mode.

X. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A vehicle gateway device comprising:
 a non-transitory computer readable storage medium including program instructions; and
 one or more processors configured to execute the program instructions to cause the vehicle gateway device to:
  initiate a network connection with a remote management server;

maintain a first power mode, wherein power consumption of the vehicle gateway device at the first power mode corresponds to a first power level;

enter a second power mode, wherein power consumption of the vehicle gateway device at the second power mode corresponds to a second power level, wherein the second power level is less than the first power level;

in response to entering the second power mode, reduce activity of the vehicle gateway device;

maintain the network connection with the remote management server, wherein maintaining the network connection comprises transmitting a keep alive message between the vehicle gateway device and the remote management server;

obtain a request for data associated with the vehicle gateway device from the remote management server using the network connection;

in response to obtaining the request from the remote management server, enter the first power mode; and transmit, to the remote management server, a response to the request.

2. The vehicle gateway device of claim 1, wherein to reduce the activity of the vehicle gateway device, the one or more processors are configured to execute the program instructions to further cause the vehicle gateway device, at the second power mode, to:

sample an accelerometer at a second rate, wherein the vehicle gateway device at the first power mode samples the accelerometer at a first rate, wherein the first rate is greater than the second rate.

3. The vehicle gateway device of claim 1, wherein the second power mode comprises a standby power mode.

4. The vehicle gateway device of claim 1, wherein to transmit the keep alive message between the vehicle gateway device and the remote management server, the one or more processors are configured to execute the program instructions to further cause the vehicle gateway device to:

receive a first keep alive message from the remote management server;

transmit a second keep alive message to the remote management server; and receive an acknowledgement from the remote management server.

5. The vehicle gateway device of claim 1, wherein to transmit the keep alive message between the vehicle gateway device and the remote management server, the one or more processors are configured to execute the program instructions to further cause the vehicle gateway device to:

receive a first keep alive message from the remote management server; and transmit an acknowledgement to the remote management server.

6. The vehicle gateway device of claim 1, wherein the response to the request comprises a vehicle metric, wherein the vehicle metric is associated with at least one of: cruise control, coasting, accelerator pedal, idling, anticipation, engine rotations per minute, motor rotations per minute, or motor power.

7. The vehicle gateway device of claim 1, wherein to reduce the activity of the vehicle gateway device, the one or more processors are configured to execute the program instructions to further cause the vehicle gateway device to:

deactivate a server of the vehicle gateway device.

8. The vehicle gateway device of claim 1, wherein to reduce the activity of the vehicle gateway device, the one or more processors are configured to execute the program instructions to further cause the vehicle gateway device to:

block log pushes.

9. The vehicle gateway device of claim 1, wherein to reduce the activity of the vehicle gateway device, the one or more processors are configured to execute the program instructions to further cause the vehicle gateway device to:

eliminate network time protocol requests.

10. The vehicle gateway device of claim 1, wherein to reduce the activity of the vehicle gateway device, the one or more processors are configured to execute the program instructions to further cause the vehicle gateway device to:

reduce computing operations of the vehicle gateway device.

11. The vehicle gateway device of claim 1, wherein transmitting the keep alive message between the vehicle gateway device and the remote management server is based at least in part on a keep alive interval.

12. The vehicle gateway device of claim 11, wherein the keep alive interval is approximately 120 seconds.

13. The vehicle gateway device of claim 1, wherein the keep alive message comprises a first keep alive message, wherein transmitting the first keep alive message between the vehicle gateway device and the remote management server is based at least in part on a first keep alive interval, wherein the one or more processors are configured to execute the program instructions to further cause the vehicle gateway device to:

transmit a second keep alive message between the vehicle gateway device at the first power mode and the remote management server based on a second keep alive interval.

14. The vehicle gateway device of claim 13, wherein the second keep alive interval is less than the first keep alive interval.

15. The vehicle gateway device of claim 1, wherein entering the second power mode is based at least in part on not receiving input for a period of time from one or more of:

an accelerometer;

a vehicle battery; or a vehicle computer.

16. The vehicle gateway device of claim 1, wherein the request comprises a request for a vehicle metric, and wherein the response to the request comprises the vehicle metric.

17. The vehicle gateway device of claim 1, wherein the network connection comprises a Long-Term Evolution network connection.

18. A computer-implemented method comprising:

initiating a network connection with a remote management server;

maintaining a first power mode, wherein power consumption of a vehicle gateway device at the first power mode corresponds to a first power level;

entering a second power mode, wherein power consumption of the vehicle gateway device at the second power mode corresponds to a second power level, wherein the second power level is less than the first power level;

in response to entering the second power mode, reducing activity of the vehicle gateway device;

maintaining the network connection with the remote management server, wherein maintaining the network connection comprises transmitting a keep alive message between the vehicle gateway device and the remote management server;

obtaining a request for data associated with the vehicle gateway device from the remote management server using the network connection;

in response to obtaining the request from the remote management server, entering the first power mode; and transmitting, to the remote management server, a response to the request.

19. The computer-implemented method of claim 18, wherein the network connection comprises a Long-Term Evolution network connection.

20. A vehicle gateway device comprising:

a non-transitory computer readable storage medium including program instructions; and one or more processors configured to execute the program instructions to cause the vehicle gateway device to:

initiate a Long-Term Evolution network connection with a remote management server;

maintain a first power mode, wherein power consumption of the vehicle gateway device at the first power mode corresponds to a first power level;

enter a second power mode, wherein power consumption of the vehicle gateway device at the second power mode corresponds to a second power level, wherein the second power level is less than the first power level;

in response to entering the second power mode, reduce activity of the vehicle gateway device;

maintain the Long-Term Evolution network connection with the remote management server, wherein maintaining the Long-Term Evolution network connection comprises transmitting a keep alive message between the vehicle gateway device and the remote management server;

obtain a request for a vehicle metric from the remote management server using the Long-Term Evolution network connection;

in response to obtaining the request for the vehicle metric, enter the first power mode; and transmit, to the remote management server, the vehicle metric.

\* \* \* \* \*